United States Patent
Adams et al.

(10) Patent No.: US 12,088,638 B2
(45) Date of Patent: Sep. 10, 2024

(54) SYSTEMS AND METHODS FOR A WEBINAR BACKSTAGE

(71) Applicant: Zoom Video Communications, INC., San Jose, CA (US)

(72) Inventors: Kathleen Lucille Adams, Overland Park, KS (US); John Beckmann, San Francisco, CA (US); Annika Elias, Seattle, WA (US); Pankaj Prasad, San Francisco, CA (US)

(73) Assignee: Zoom Video Communications, Inc., San Jose, CA (US)

( * ) Notice: Subject to any disclaimer, the term of this patent is extended or adjusted under 35 U.S.C. 154(b) by 89 days.

(21) Appl. No.: 17/514,553

(22) Filed: Oct. 29, 2021

(65) Prior Publication Data

US 2023/0138534 A1    May 4, 2023

(51) Int. Cl.
*H04L 65/1066*    (2022.01)
*H04L 51/046*    (2022.01)
*H04L 65/403*    (2022.01)

(52) U.S. Cl.
CPC ........ *H04L 65/1066* (2013.01); *H04L 51/046* (2013.01); *H04L 65/403* (2013.01)

(58) Field of Classification Search
CPC ...... H04L 65/403; H04L 63/083; G06F 21/31
See application file for complete search history.

(56) References Cited

U.S. PATENT DOCUMENTS

| | | | | |
|---|---|---|---|---|
| 11,343,293 | B1* | 5/2022 | Slotznick | H04N 5/272 |
| 2011/0300841 | A1* | 12/2011 | Archambault | H04L 12/1818 |
| | | | | 455/416 |
| 2012/0185291 | A1* | 7/2012 | Ramaswamy | H04L 12/1818 |
| | | | | 705/7.19 |
| 2016/0255127 | A1* | 9/2016 | Baribault | G06F 21/31 |
| | | | | 709/204 |

FOREIGN PATENT DOCUMENTS

WO    2016137692 A1    9/2016

OTHER PUBLICATIONS

Cxotoday News Desk, "VideoMeet becomes the first virtual meeting solution to launch backstage", Retrieved from https://www.cxotoday.com/press-release/videomeet-becomes-the-first-virtual-meeting-solution-to-launch-backstage/ on Oct. 29, 2021., Dec. 29, 2020, 8 pages.

EP International Search Report and Written Opinion for PCT/US2022/046236 mailed Feb. 1, 2023.

Jersic et al., "Video production systems for videoconferencing and distance learning solutions", 16th International Conference on Telecommunications (ConTEL 2021), Jun. 30-Jul. 2, 2021, Zagreb Croatia; pp. 97-104.

* cited by examiner

*Primary Examiner* — Amal S Zenati
(74) *Attorney, Agent, or Firm* — Kilpatrick Townsend & Stockton LLP

(57) ABSTRACT

Provided herein are methods and systems for a webinar backstage. A method may include receiving, from a first client device, webinar access information. The first client device may be identified based on the webinar access information. The method may also include transmitting, to the first client device, webinar backstage access information, and transmitting to the first client device: a first set of audio and video streams corresponding to a webinar mainstage and a second set of audio and video streams corresponding to a webinar backstage.

20 Claims, 11 Drawing Sheets

SYSTEMS AND METHODS FOR A WEBINAR BACKSTAGE

FIELD

The present application generally relates to video conferences and more particularly relates to systems and methods for a webinar backstage.

BRIEF DESCRIPTION OF THE DRAWINGS

The accompanying drawings, which are incorporated into and constitute a part of this specification, illustrate one or more certain examples and, together with the description of the example, serve to explain the principles and implementations of the certain examples.

DETAILED DESCRIPTION OF THE DRAWINGS

Figure 1:
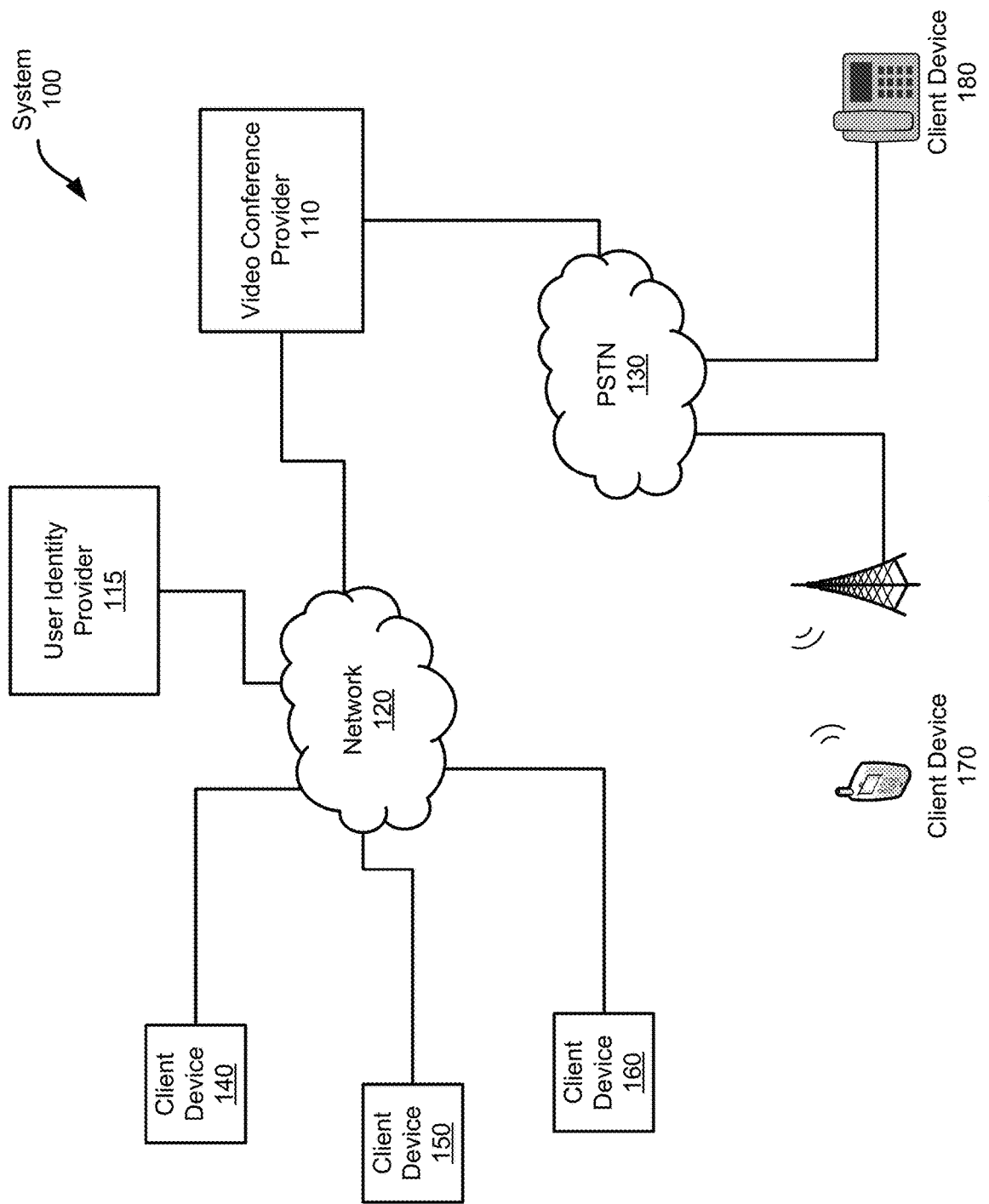
FIGS. 1, 2, and 3A-3B show example systems for providing a webinar backstage during a webinar event, according to an embodiment herein.

Examples are described herein in the context of systems and methods for providing a webinar backstage during a webinar event. Those of ordinary skill in the art will realize that the following description is illustrative only and is not intended to be in any way limiting. Reference will now be made in detail to implementations of examples as illustrated in the accompanying drawings. The same reference indicators will be used throughout the drawings and the following description to refer to the same or like items.

In the interest of clarity, not all of the routine features of the examples described herein are shown and described. It will, of course, be appreciated that in the development of any such actual implementation, numerous implementation-specific decisions must be made in order to achieve the developer's specific goals, such as compliance with application- and business-related constraints, and that these specific goals will vary from one implementation to another and from one developer to another.

Video conference providers can enable people to interact with each other using their own computers (or "client devices") with both video and audio in a variety of settings, such as in one-on-one conversations, group meetings, and webinars. While each of these types of settings can allow people to interact with each other, they can differ in character. For example, one-on-one conversations include only two people and may involve only a small amount of data being transmitted between the two client devices. Group meetings may involve a larger number of people all interacting with each other. In contrast, webinars typically involve a group of people that are attending to hear presentations from one or more presenters. Thus, in a webinar, interaction tends to be mostly one-way: from the presenter(s) to the audience. In addition, webinars can have very large numbers of participants, potentially numbering in the thousands or tens of thousands.

In addition to numerous participants, webinars often have numerous presenters or panelists. Managing a video conference having multiple presenters can be a challenging task for the webinar host(s). A common problem for the host(s) is the timing of panelists. For example, a webinar having multiple panelists may run into issues with hand-offs between panelists. Panelists are generally people who bring value to the audience, and the webinar itself, and generally have tight schedules. Often panelists are coming into a webinar right before the webinar starts, or in some cases the panelists are late and the webinar has to start to allow attendees to enter the webinar. When that happens, there may not be enough time for panelists to prepare themselves before going live to the webinar audience.

To allow panelists a space to prepare for and exchange information behind the scene of the webinar, a webinar backstage can be provided. A webinar backstage, also referred to as the "backstage," is a persistent space that allows panelists to check in, discuss topics with other panelists, and prepare to go live on the webinar mainstage in front of the webinar audience. For example, before going live to the webinar mainstage, a panelist may set a virtual background, verify appropriate branding is in view, and perform a microphone and sound check.

A backstage may be useful for longer webinar events. That is, a webinar event that has a multi-hour duration and multiple panelists presenting at different times during the webinar event. A panelist presenting during the second half of the webinar does not need to be on and presenter-ready during the first half of the webinar. Moreover, as noted above panelists typically have tight schedules. Thus, the backstage provides a panelist presenting later during an event a space to prepare before going live to the webinar mainstage.

Another feature that a backstage provides is a space for a webinar host to provide private feedback to panelists after a webinar has ended. For example, the backstage may allow the host a space to debrief the panelists and thank the panelists for presenting during the webinar. When a webinar event concludes, the audience may sign-off when the mainstage closes. The panelists and host may rendezvous in the backstage for debriefing and discussion purposes. Still further advantages may be illustrated throughout this disclosure.

This illustrative example is given to introduce the reader to the general subject matter discussed herein and the disclosure is not limited to this example. The following sections describe various additional non-limiting examples and examples of systems and methods for providing a webinar backstage during a webinar.

Referring now to FIG. 1, FIG. 1 shows an example system 100 that provides videoconferencing functionality to various client devices. The system 100 includes a video conference provider 110 that is connected to multiple communication networks 120, 130, through which various client devices 140-180 can participate in video conferences hosted by the video conference provider 110. For example, the video conference provider 110 can be located within a private network to provide video conferencing services to devices within the private network, or it can be connected to a public network, e.g., the internet, so it may be accessed by anyone. Some examples may even provide a hybrid model in which a video conference provider 110 may supply components to enable a private organization to host private internal video conferences or to connect its system to the video conference provider 110 over a public network.

The system optionally also includes one or more user identity providers, e.g., user identity provider 115, which can provide user identity services to users of the client devices 140-160 and may authenticate user identities of one or more users to the video conference provider 110. In this example, the user identity provider 115 is operated by a different entity than the video conference provider 110, though in some examples, they may be the same entity.

Figure 2:
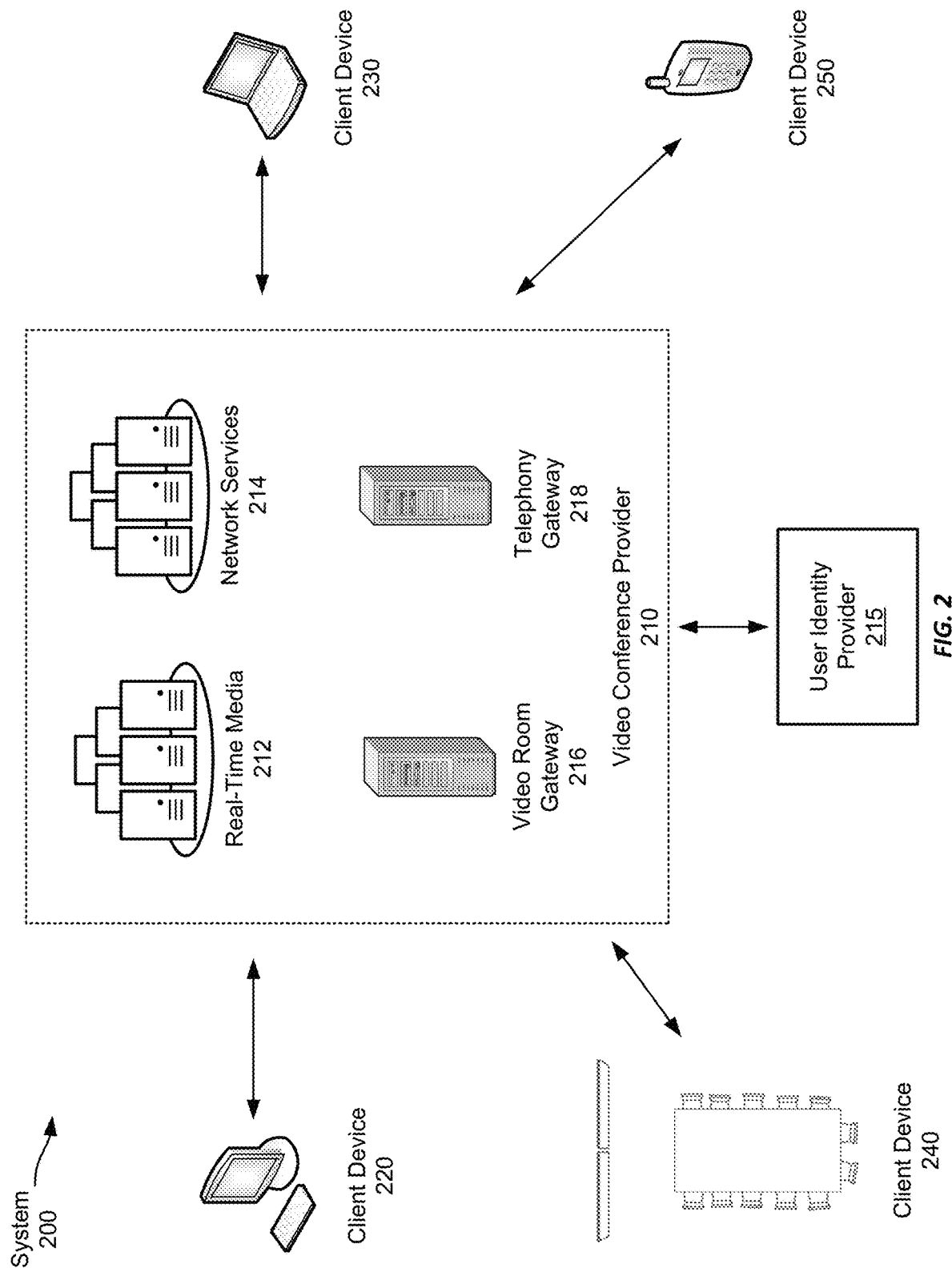

Video conference provider 110 allows clients to create videoconference meetings (or "meetings") and invite others to participate in those meetings as well as perform other related functionality, such as recording the meetings, generating transcripts from meeting audio, manage user functionality in the meetings, enable text messaging during the meetings, create and manage breakout rooms from the main meeting, etc. FIG. 2, described below, provides a more detailed description of the architecture and functionality of the video conference provider 110. It should be understood that the term "meeting" encompasses the term "webinar" used herein.

Meetings in this example video conference provider 110 are provided in virtual "stages" or rooms to which participants are connected. The stage or room in this context is a construct provided by a server that provides a common point at which the various video and audio data is received before being multiplexed and provided to the various participants. While a "stage" is the label for this concept in this disclosure, any suitable functionality that enables multiple participants to participate in a common videoconference may be used. Further, in some examples, and as alluded to above, a meeting may also have "a backstage". A backstage as provided herein may be a "room" that is associated with a "main" videoconference room or "mainstage". Thus, participants with permissions in the main videoconference room may exit the room into a backstage, e.g., to discuss a particular topic, before returning to the main stage.

To create a meeting with the video conference provider 110, a user may contact the video conference provider 110 using a client device 140-180 and select an option to create a new meeting. Such an option may be provided in a webpage accessed by a client device 140-160 or client application executed by a client device 140-160. For telephony devices, the user may be presented with an audio menu that they may navigate by pressing numeric buttons on their telephony device. To create the meeting, the video conference provider 110 may prompt the user for certain information, such as a date, time, and duration for the meeting, a number of participants, a type of encryption to use, whether the meeting is confidential or open to the public, etc. After receiving the various meeting settings, the video conference provider may create a record for the meeting and generate a meeting identifier and, in some examples, a corresponding meeting password or passcode (or other authentication information), all of which meeting information is provided to the meeting host.

After receiving the meeting information, the user may distribute the meeting information to one or more users to invite them to the meeting. To begin the meeting at the scheduled time (or immediately, if the meeting was set for an immediate start), the host provides the meeting identifier and, if applicable, corresponding authentication information (e.g., a password or passcode). The video conference system then initiates the meeting and may admit users to the meeting. Depending on the options set for the meeting, the users may be admitted immediately upon providing the appropriate meeting identifier (and authentication information, as appropriate), even if the host has not yet arrived, or the users may be presented with information indicating the that meeting has not yet started or the host may be required to specifically admit one or more of the users. As described in more detail below, depending on the authentication information of a given user, a user may be admitted to the mainstage or the backstage.

During the meeting, the participants may employ their client devices 140-180 to capture audio or video information and stream that information to the video conference provider 110. They also receive audio or video information from the video conference provider 210, which is displayed by the respective client device 140 to enable the various users to participate in the meeting.

At the end of the meeting, the host may select an option to terminate the meeting, or it may terminate automatically at a scheduled end time or after a predetermined duration. When the meeting terminates, the various participants are disconnected from the meeting and they will no longer receive audio or video streams for the meeting (and will stop transmitting audio or video streams). The video conference provider 110 may also invalidate the meeting information, such as the meeting identifier or password/passcode. As discussed in detail below, in some embodiments, the meeting may terminate for only one room or stage, thereby disconnecting only participants in that stage. For example, the mainstage may terminate and disconnect attendees in the mainstage but the backstage may continue allowing participants therein to continue exchanging audio and video streams.

To provide such functionality, one or more client devices 140-180 may communicate with the video conference provider 110 using one or more communication networks, such as network 120 or the public switched telephone network ("PSTN") 130. The client devices 140-180 may be any suitable computing or communications device that have audio or video capability. For example, client devices 140-160 may be conventional computing devices, such as desktop or laptop computers having processors and computer-readable media, connected to the video conference provider 110 using the internet or other suitable computer network. Suitable networks include the internet, any local area network ("LAN"), metro area network ("MAN"), wide area network ("WAN"), cellular network (e.g., 3G, 4G, 4G LTE, 5G, etc.), or any combination of these. Other types of computing devices may be used instead or as well, such as tablets, smartphones, and dedicated video conferencing equipment. Each of these devices may provide both audio and video capabilities and may enable one or more users to participate in a video conference meeting hosted by the video conference provider 110.

In addition to the computing devices discussed above, client devices 140-180 may also include one or more telephony devices, such as cellular telephones (e.g., cellular telephone 170), internet protocol ("IP") phones (e.g., telephone 180), or conventional telephones. Such telephony devices may allow a user to make conventional telephone calls to other telephony devices using the PSTN, including the video conference provider 110. It should be appreciated that certain computing devices may also provide telephony functionality and may operate as telephony devices. For example, smartphones typically provide cellular telephone capabilities and thus may operate as telephony devices in the example system 100 shown in FIG. 1. In addition, conventional computing devices may execute software to enable telephony functionality, which may allow the user to make and receive phone calls, e.g., using a headset and microphone. Such software may communicate with a PSTN gateway to route the call from a computer network to the PSTN. Thus, telephony devices encompass any devices that can making conventional telephone calls and is not limited solely to dedicated telephony devices like conventional telephones.

Referring again to client devices 140-160, these devices 140-160 contact the video conference provider 110 using network 120 and may provide information to the video conference provider 110 to access functionality provided by the video conference provider 110, such as access to create new meetings or join existing meetings. To do so, the client devices 140-160 may provide user identification information, meeting identifiers, meeting passwords or passcodes, etc. In examples that employ a user identity provider 115, a client device, e.g., client devices 140-160, may operate in conjunction with a user identity provider 115 to provide user identification information or other user information to the video conference provider 110.

A user identity provider 115 may be any entity trusted by the video conference provider 110 that can help identify a user to the video conference provider 110. For example, a trusted entity may be a server operated by a business or other organization and with whom the user has established their identity, such as an employer or trusted third-party. The user may sign into the user identity provider 115, such as by providing a username and password, to access their identity at the user identity provider 115. The identity, in this sense, is information established and maintained at the user identity provider 115 that can be used to identify a particular user, irrespective of the client device they may be using. An example of an identity may be an email account established at the user identity provider 110 by the user and secured by a password or additional security features, such as biometric authentication, two-factor authentication, etc. However, identities may be distinct from functionality such as email. For example, a health care provider may establish identities for its patients. And while such identities may have associated email accounts, the identity is distinct from those email accounts. Thus, a user's "identity" relates to a secure, verified set of information that is tied to a particular user and should be accessible only by that user. By accessing the identity, the associated user may then verify themselves to other computing devices or services, such as the video conference provider 110.

When the user accesses the video conference provider 110 using a client device, the video conference provider 110 communicates with the user identity provider 115 using information provided by the user to verify the user's identity. For example, the user may provide a username or cryptographic signature associated with a user identity provider 115. The user identity provider 115 then either confirms the user's identity or denies the request. Based on this response, the video conference provider 110 either provides or denies access to its services, respectively.

For telephony devices, e.g., client devices 170-180, the user may place a telephone call to the video conference provider 110 to access video conference services. After the call is answered, the user may provide information regarding a video conference meeting, e.g., a meeting identifier ("ID"), a passcode or password, etc., to allow the telephony device to join the meeting and participate using audio devices of the telephony device, e.g., microphone(s) and speaker(s), even if video capabilities are not provided by the telephony device.

Because telephony devices typically have more limited functionality than conventional computing devices, they may be unable to provide certain information to the video conference provider 110. For example, telephony devices may be unable to provide user identification information to identify the telephony device or the user to the video conference provider 110. Thus, the video conference provider 110 may provide more limited functionality to such telephony devices. For example, the user may be permitted to join a meeting after providing meeting information, e.g., a meeting identifier and passcode, but they may be identified only as an anonymous participant in the meeting. This may restrict their ability to interact with the meetings in some examples, such as by limiting their ability to speak in the meeting, hear or view certain content shared during the meeting, or access other meeting functionality, such as joining breakout rooms or engaging in text chat with other participants in the meeting.

It should be appreciated that users may choose to participate in meetings anonymously and decline to provide user identification information to the video conference provider 110, even in cases where the user has an authenticated identity and employs a client device capable of identifying the user to the video conference provider 110. The video conference provider 110 may determine whether to allow such anonymous users to use services provided by the video conference provider 110. Anonymous users, regardless of the reason for anonymity, may be restricted as discussed above with respect to users employing telephony devices, and in some cases may be prevented from accessing certain meetings or other services, or may be entirely prevented from accessing the video conference provider 110.

Referring again to video conference provider 110, in some examples, it may allow client devices 140-160 to encrypt their respective video and audio streams to help improve privacy in their meetings. Encryption may be provided between the client devices 140-160 and the video conference provider 110 or it may be provided in an end-to-end configuration where multimedia streams (e.g., audio or video streams) transmitted by the client devices 140-160 are not decrypted until they are received by another client device 140-160 participating in the meeting. Encryption may also be provided during only a portion of a communication, for example encryption may be used for otherwise unencrypted communications that cross international borders.

Client-to-server encryption may be used to secure the communications between the client devices 140-160 and the video conference provider 110, while allowing the video conference provider 110 to access the decrypted multimedia streams to perform certain processing, such as recording the meeting for the participants or generating transcripts of the meeting for the participants. End-to-end encryption may be used to keep the meeting entirely private to the participants without any worry about a video conference provider 110 having access to the substance of the meeting. Any suitable encryption methodology may be employed, including key-pair encryption of the streams. For example, to provide end-to-end encryption, the meeting host's client device may obtain public keys for each of the other client devices participating in the meeting and securely exchange a set of keys to encrypt and decrypt multimedia content transmitted during the meeting. Thus the client devices 140-160 may securely communicate with each other during the meeting.

Further, in some examples, certain types of encryption may be limited by the types of devices participating in the meeting. For example, telephony devices may lack the ability to encrypt and decrypt multimedia streams. Thus, while encrypting the multimedia streams may be desirable in many instances, it is not required as it may prevent some users from participating in a meeting.

By using the example system shown in FIG. 1, users can create and participate in meetings using their respective client devices 140-180 via the video conference provider 110. Further, such a system enables users to use a wide variety of different client devices 140-180 from traditional standards-based video conferencing hardware to dedicated video conferencing equipment to laptop or desktop computers to handheld devices to legacy telephony devices. etc.

Referring now to FIG. 2, FIG. 2 shows an example system 200 in which a video conference provider 210 provides videoconferencing functionality to various client devices 220-250. The client devices 220-250 include two conventional computing devices 220-230, dedicated equipment for a video conference room 240, and a telephony device 250. Each client device 220-250 communicates with the video conference provider 210 over a communications network, such as the internet for client devices 220-240 or the PSTN for client device 250, generally as described above with respect to FIG. 1. The video conference provider 210 is also in communication with one or more user identity providers 215, which can authenticate various users to the video conference provider 210 generally as described above with respect to FIG. 1.

In this example, the video conference provider 210 employs multiple different servers (or groups of servers) to provide different Examples of video conference functionality, thereby enabling the various client devices to create and participate in video conference meetings. The video conference provider 210 uses one or more real-time media servers 212, one or more network services servers 214, one or more video room gateways 216, and one or more telephony gateways 218. Each of these servers 212-218 is connected to one or more communications networks to enable them to collectively provide access to and participation in one or more video conference meetings to the client devices 220-250.

The real-time media servers 212 provide multiplexed multimedia streams to meeting participants, such as the client devices 220-250 shown in FIG. 2. While video and audio streams typically originate at the respective client devices, they are transmitted from the client devices 220-250 to the video conference provider 210 via one or more networks where they are received by the real-time media servers 212. The real-time media servers 212 determine which protocol is optimal based on, for example, proxy settings and the presence of firewalls, etc. For example, the client device might select among UDP, TCP, TLS, or HTTPS for audio and video and UDP for content screen sharing.

The real-time media servers 212 then multiplex the various video and audio streams based on the target client device and communicate multiplexed streams to each client device. For example, the real-time media servers 212 receive audio and video streams from client devices 220-240 and only an audio stream from client device 250. The real-time media servers 212 then multiplex the streams received from devices 230-250 and provide the multiplexed stream to client device 220. The real-time media servers 212 are adaptive, for example, reacting to real-time network and client changes, in how they provide these streams. For example, the real-time media servers 212 may monitor parameters such as a client's bandwidth CPU usage, memory and network I/O as well as network parameters such as packet loss, latency and jitter to determine how to modify the way in which streams are provided.

The client device 220 receives the stream, performs any decryption, decoding, and demultiplexing on the received streams, and then outputs the audio and video using the client device's video and audio devices. In this example, the real-time media servers do not multiplex client device 220's own video and audio feeds when transmitting streams to it. Instead each client device 220-250 only receives multimedia streams from other client devices 220-250. For telephony devices that lack video capabilities, e.g., client device 250, the real-time media servers 212 only deliver multiplex audio streams. The client device 220 may receive multiple streams for a particular communication, allowing the client device 220 to switch between streams to provide a higher quality of service.

In addition to multiplexing multimedia streams, the real-time media servers 212 may also decrypt incoming multimedia stream in some examples. As discussed above, multimedia streams may be encrypted between the client devices 220-250 and the video conference system 210. In some such examples, the real-time media servers 212 may decrypt incoming multimedia streams, multiplex the multimedia streams appropriately for the various clients, and encrypt the multiplexed streams for transmission.

As mentioned above with respect to FIG. 1, the video conference provider 210 may provide certain functionality with respect to unencrypted multimedia streams at a user's request. For example, the meeting host may be able to request that the meeting be recorded or that a transcript of the audio streams be prepared, which may then be performed by the real-time media servers 212 using the decrypted multimedia streams, or the recording or transcription functionality may be off-loaded to a dedicated server (or servers), e.g., cloud recording servers, for recording the audio and video streams. In some examples, the video conference provider 210 may allow a meeting participant to notify it of inappropriate behavior or content in a meeting. Such a notification may trigger the real-time media servers to 212 record a portion of the meeting for review by the video conference provider 210. Still other functionality may be implemented to take actions based on the decrypted multimedia streams at the video conference provider, such as monitoring video or audio quality, adjusting or changing media encoding mechanisms, etc.

It should be appreciated that multiple real-time media servers 212 may be involved in communicating data for a single meeting and multimedia streams may be routed through multiple different real-time media servers 212. In addition, the various real-time media servers 212 may not be co-located, but instead may be located at multiple different geographic locations, which may enable high-quality communications between clients that are dispersed over wide geographic areas, such as being located in different countries or on different continents. Further, in some examples, one or more of these servers may be co-located on a client's premises, e.g., at a business or other organization. For example, different geographic regions may each have one or more real-time media servers 212 to enable client devices in the same geographic region to have a high-quality connection into the video conference provider 210 via local servers 212 to send and receive multimedia streams, rather than connecting to a real-time media server located in a different country or on a different continent. The local real-time media servers 212 may then communicate with physically distant servers using high-speed network infrastructure, e.g., internet backbone network(s), that otherwise might not be directly available to client devices 220-250 themselves. Thus, routing multimedia streams may be distributed throughout the video conference system 210 and across many different real-time media servers 212.

Turning to the network services servers 214, these servers 214 provide administrative functionality to enable client devices to create or participate in meetings, send meeting invitations, create or manage user accounts or subscriptions, and other related functionality. Further, these servers may be configured to perform different functionalities or to operate at different levels of a hierarchy, e.g., for specific regions or localities, to manage portions of the video conference provider under a supervisory set of servers. When a client device 220-250 accesses the video conference provider 210, it will typically communicate with one or more network services servers 214 to access their account or to participate in a meeting.

When a client device 220-250 first contacts the video conference provider 210 in this example, it is routed to a network services server 214. The client device may then provide access credentials for a user, e.g., a username and password or single sign-on credentials, to gain authenticated access to the video conference provider 210. This process may involve the network services servers 214 contacting a user identity provider 215 to verify the provided credentials. Once the user's credentials have been accepted, the network services servers 214 may perform administrative functionality, like updating user account information, if the user has an identity with the video conference provider 210, or scheduling a new meeting, by interacting with the network services servers 214.

In some examples, users may access the video conference provider 210 anonymously. When communicating anonymously, a client device 220-250 may communicate with one or more network services servers 214 but only provide information to create or join a meeting, depending on what features the video conference provider allows for anonymous users. For example, an anonymous user may access the video conference provider using client 220 and provide a meeting ID and passcode. The network services server 214 may use the meeting ID to identify an upcoming or on-going meeting and verify the passcode is correct for the meeting ID. After doing so, the network services server(s) 214 may then communicate information to the client device 220 to enable the client device 220 to join the meeting and communicate with appropriate real-time media servers 212.

In cases where a user wishes to schedule a meeting, the user (anonymous or authenticated) may select an option to schedule a new meeting and may then select various meeting options, such as the date and time for the meeting, the duration for the meeting, a type of encryption to be used, one or more users to invite, privacy controls (e.g., not allowing anonymous users, preventing screen sharing, manually authorize admission to the meeting, etc.), meeting recording options, etc. The network services servers 214 may then create and store a meeting record for the scheduled meeting. When the scheduled meeting time arrives (or within a threshold period of time in advance), the network services server(s) 214 may accept requests to join the meeting from various users.

To handle requests to join a meeting, the network services server(s) 214 may receive meeting information, such as a meeting ID and passcode, from one or more client devices 220-250. The network services server(s) 214 locate a meeting record corresponding to the provided meeting ID and then confirm whether the scheduled start time for the meeting has arrived, whether the meeting host has started the meeting, and whether the passcode matches the passcode in the meeting record. If the request is made by the host, the network services server(s) 214 activates the meeting and connects the host to a real-time media server 212 to enable the host to begin sending and receiving multimedia streams.

Once the host has started the meeting, subsequent users requesting access will be admitted to the meeting if the meeting record is located and the passcode matches the passcode supplied by the requesting client device 220-250. In some examples additional access controls may be used as well. But if the network services server(s) 214 determines to admit the requesting client device 220-250 to the meeting, the network services server 214 identifies a real-time media server 212 to handle multimedia streams to and from the requesting client device 220-250 and provides information to the client device 220-250 to connect to the identified real-time media server 212. Additional client devices 220-250 may be added to the meeting as they request access through the network services server(s) 214.

After joining a meeting, client devices will send and receive multimedia streams via the real-time media servers 212, but they may also communicate with the network services servers 214 as needed during meetings. For example, if the meeting host leaves the meeting, the network services server(s) 214 may appoint another user as the new meeting host and assign host administrative privileges to that user. Hosts may have administrative privileges to allow them to manage their meetings, such as by enabling or disabling screen sharing, muting or removing users from the meeting, assigning or moving users to the backstage or mainstage, recording meetings, etc. Such functionality may be managed by the network services server(s) 214.

For example, if a host wishes to remove a user from a meeting, they may identify the user and issue a command through a user interface on their client device. The command may be sent to a network services server 214, which may then disconnect the identified user from the corresponding real-time media server 212. If the host wishes to move one or more participants to the backstage, such a command may also be handled by a network services server 214, which may provide authentication information to the one or more participants for joining the backstage and then connect the one or more participants to the backstage similarly to how it originally admitted the participants to the meeting itself.

In addition to creating and administering on-going meetings, the network services server(s) 214 may also be responsible for closing and tearing-down meetings once they have completed. For example, the meeting host may issue a command to end an on-going meeting, which is sent to a network services server 214. The network services server 214 may then remove any remaining participants from the meeting, communicate with one or more real time media servers 212 to stop streaming audio and video for the meeting, and deactivate, e.g., by deleting a corresponding passcode for the meeting from the meeting record, or delete the meeting record(s) corresponding to the meeting. Thus, if a user later attempts to access the meeting, the network services server(s) 214 may deny the request.

Depending on the functionality provided by the video conference provider, the network services server(s) 214 may provide additional functionality, such as by providing private meeting capabilities for organizations, special types of meetings (e.g., webinars), etc. Such functionality may be provided according to various examples of video conferencing providers according to this description.

Referring now to the video room gateway servers 216, these servers 216 provide an interface between dedicated video conferencing hardware, such as may be used in dedicated video conferencing rooms. Such video conferencing hardware may include one or more cameras and microphones and a computing device designed to receive video and audio streams from each of the cameras and microphones and connect with the video conference provider 210. For example, the video conferencing hardware may be provided by the video conference provider to one or more of its subscribers, which may provide access credentials to the video conferencing hardware to use to connect to the video conference provider 210.

The video room gateway servers 216 provide specialized authentication and communication with the dedicated video conferencing hardware that may not be available to other client devices 220-230, 250. For example, the video conferencing hardware may register with the video conference provider when it is first installed and the video room gateway may authenticate the video conferencing hardware using such registration as well as information provided to the video room gateway server(s) 216 when dedicated video conferencing hardware connects to it, such as device ID information, subscriber information, hardware capabilities, hardware version information etc. Upon receiving such information and authenticating the dedicated video conferencing hardware, the video room gateway server(s) 216 may interact with the network services servers 214 and real-time media servers 212 to allow the video conferencing hardware to create or join meetings hosted by the video conference provider 210.

Referring now to the telephony gateway servers 218, these servers 218 enable and facilitate telephony devices' participation in meetings hosed by the video conference provider 210. Because telephony devices communicate using the PSTN and not using computer networking protocols, such as TCP/IP, the telephony gateway servers 218 act as an interface that converts between the PSTN and the networking system used by the video conference provider 210.

For example, if a user uses a telephony device to connect to a meeting, they may dial a phone number corresponding to one of the video conference provider's telephony gateway servers 218. The telephony gateway server 218 will answer the call and generate audio messages requesting information from the user, such as a meeting ID and passcode. The user may enter such information using buttons on the telephony device, e.g., by sending dual-tone multi-frequency ("DTMF") audio signals to the telephony gateway server 218. The telephony gateway server 218 determines the numbers or letters entered by the user and provides the meeting ID and passcode information to the network services servers 214, along with a request to join or start the meeting, generally as described above. Once the telephony client device 250 has been accepted into a meeting, the telephony gateway server 218 is instead joined to the meeting on the telephony device's behalf.

After joining the meeting, the telephony gateway server 218 receives an audio stream from the telephony device and provides it to the corresponding real-time media server 212, and receives audio streams from the real-time media server 212, decodes them, and provides the decoded audio to the telephony device. Thus, the telephony gateway servers 218 operate essentially as client devices, while the telephony device operates largely as an input/output device, e.g., a microphone and speaker, for the corresponding telephony gateway server 218, thereby enabling the user of the telephony device to participate in the meeting despite not using a computing device or video.

It should be appreciated that the components of the video conference provider 210 discussed above are merely examples of such devices and an example architecture. Some video conference providers may provide more or less functionality than described above and may not separate functionality into different types of servers as discussed above. Instead, any suitable servers and network architectures may be used according to different examples.

Figure 3A:
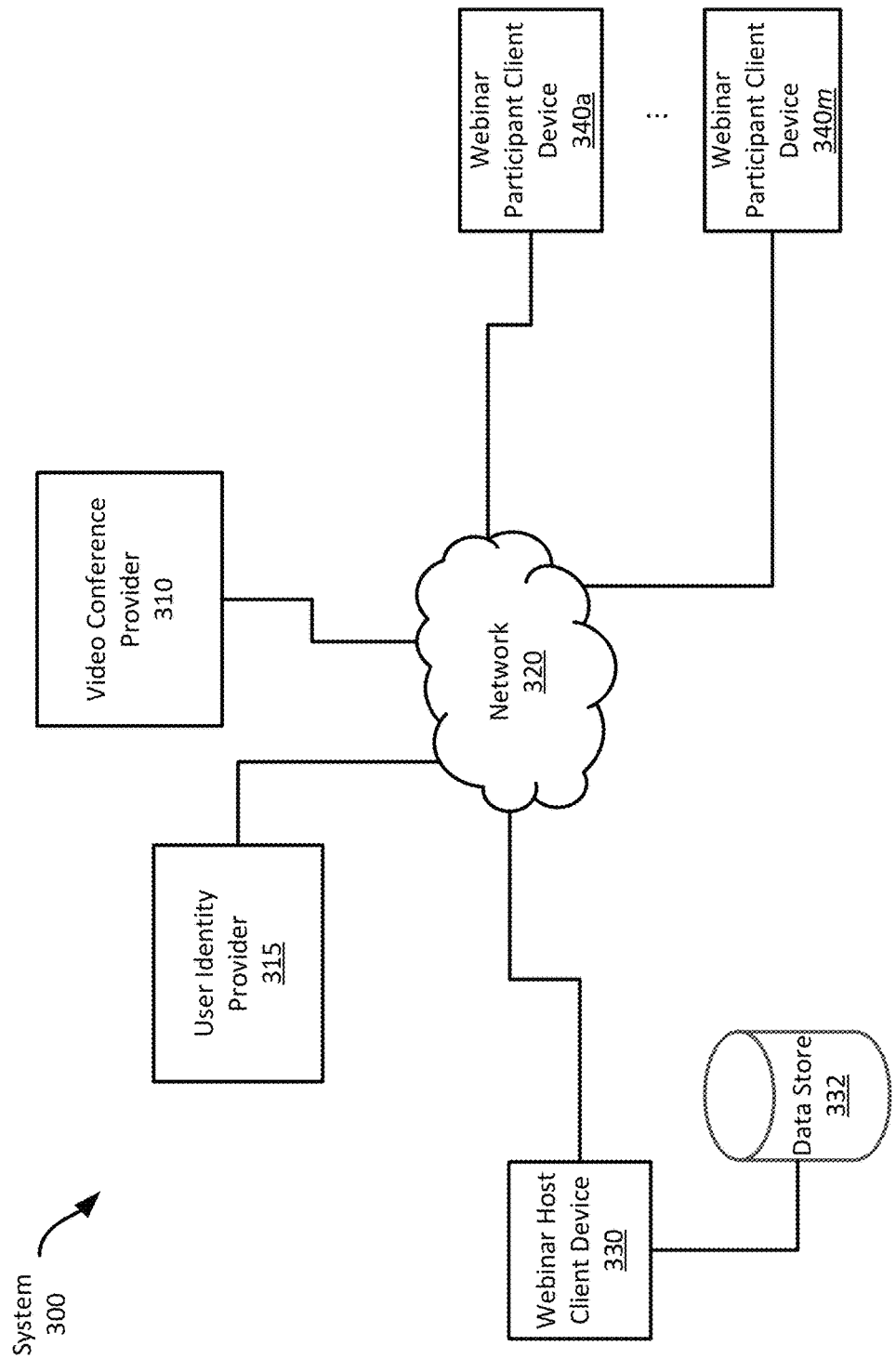

Referring now to FIG. 3A, FIG. 3A shows an example system 300 for providing a webinar backstage during a meeting or webinar event. In this example, a video conference provider 310, such as the video conference provider 110, 210 in FIG. 1 or 2, is connected to a communications network 320, such as the internet. A webinar host client device 330, a user identity provider 315, and a number of webinar participant client devices 340*a-m* (m representing any number of webinar participant client devices in this example) are also connected to the network 320.

The webinar host client device 330 connects to the video conference provider 310 and begins a webinar meeting (or "webinar") at the video conference provider 310, such as by beginning a scheduled webinar, generally as described above with respect to FIGS. 1 and 2. However, when scheduling the meeting, the host schedules the meeting as a webinar. In this example, the video conference provider 310 creates and manages webinar meetings similarly to how it handles conventional meetings as discussed above. However, because webinars generally are intended to operate one-way from the presenter(s) to the participants, the video conference provider 310 may limit certain functionality to general participants to the webinar.

For example, in a webinar the video conference provider 310 may prevent participants from unmuting their microphone or from streaming video to the webinar for other participants to view. In addition, unlike in a conventional meeting, the participants in a webinar may not receive any information about other participants in the webinar. In a conventional meeting, participants may be able to interact with other participants and see their respective names, such as in close proximity to other participants' video streams or in a list of participants visible in a graphical user interface ("GUI"). Instead, in a webinar, the participants may only be able to see information, e.g., names or video feeds, from the host(s) of the webinar or certain select participants that will be engaged in discussions during the webinar, such as panelists in a panel discussion. Still other limits may be imposed on the various participants, such as their ability to react to occurrences during the webinar, e.g., participants may be allowed to interact with their GUI to raise their hand to ask a question, but may not be allowed to provide any other feedback.

When the video conference provider 310 begins the webinar, it creates a new meeting (including any applicable restrictions, such as those discussed above) and provides video and audio feeds that may be accessed by participants to receive video and audio content during the webinar. Participants, through their respective webinar participant client devices 340*a-m*, may join the webinar once it has started and connect to the available video and audio feeds.

Figure 3B:
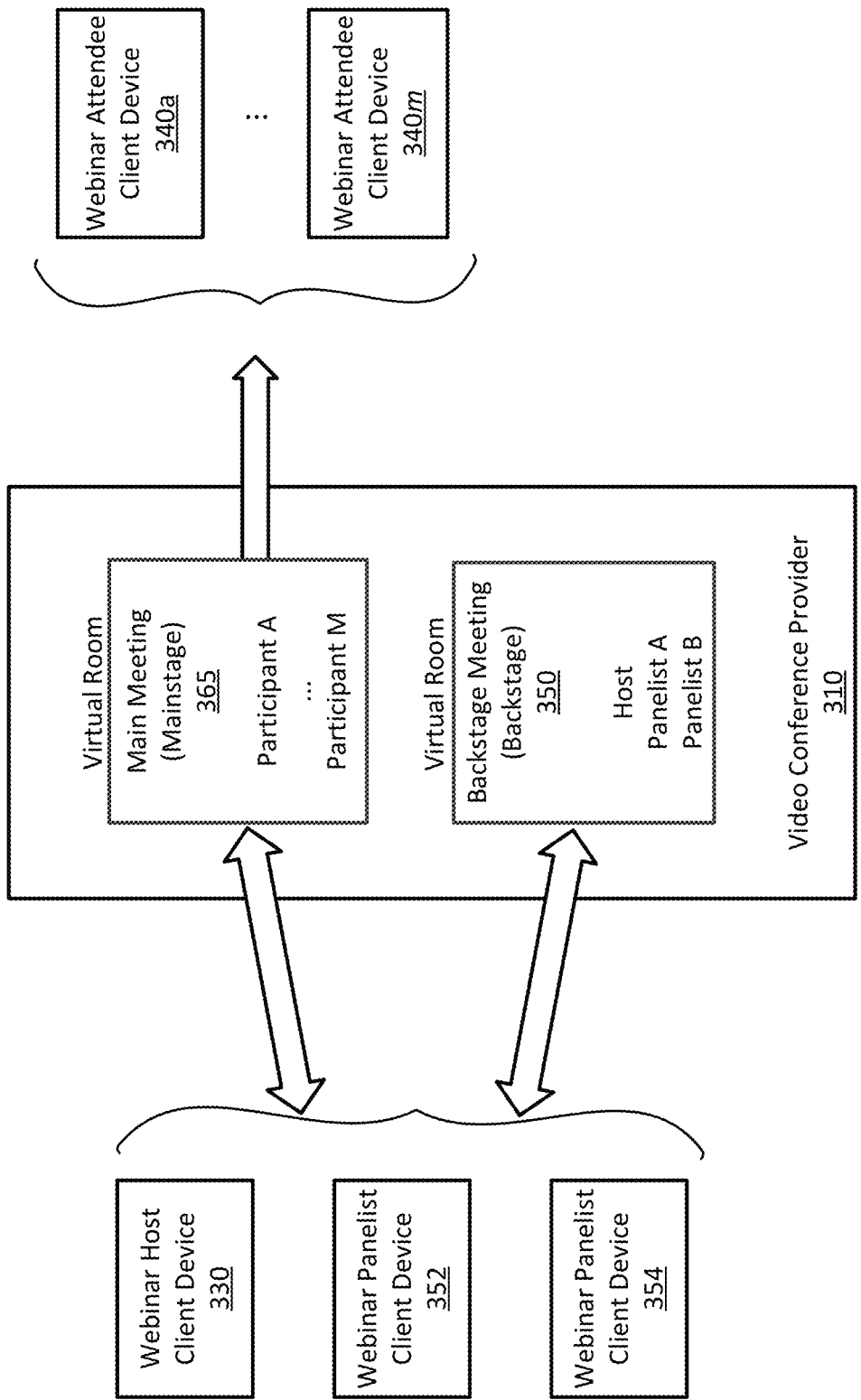

As part of the webinar, one or more panelists may present to the other participants on a webinar mainstage ("mainstage"). In addition to a mainstage, the webinar may also include a webinar backstage ("backstage"). FIG. 3B illustrates a webinar including a mainstage 365 and a backstage

350. In one example, video conference provider 310 may establish a mainstage 365, which hosts the main event. Video conference provider 310 may also establish backstage 350, in which panelists or presenters of the main event can meet before presenting on the mainstage.

Mainstage 365 and backstage 350 may be considered virtual "rooms" in which participants of the webinar can meet and communicate. Mainstage 365 is a virtual "room" in which all participants of the webinar can virtually meet. Participants of the webinar may have various types of roles. For example, there may be one or more host role(s) (e.g., the participant corresponding to webinar host client device 330), one or more panelist role(s) (e.g., the participants corresponding to webinar panelist client devices 352, 354), and one or more attendees role(s) (e.g., participants corresponding to webinar attendee client devices 340a-340m).

Depending on the role of a particular participant in the webinar, various restrictions may apply. A host may have little to no restrictions. The level of restrictions for a host role may be set by the video conference provider 310 or by the host. In cases where there is a co-host or more than one host role, hosts may have varying levels of restrictions. For example, a main host (e.g., the host who arranged the webinar) may be running late and assign another participant the role of co-host to begin the webinar on time. The main host may also assign various restrictions to the co-host, such as not allowing the co-host to change the roles of other participants.

Panelists of the webinar may have more restrictions than the host. The level of restriction of the panelist role may be set by the host or the video conference provider 310. The panelist may be able to present content, including audio and video streams, on the mainstage 365 and may be allowed to access to the backstage. The panelist, however, may not be able to change the roles of other participants or admit/invite other participants to the webinar.

Attendees of the webinar may have numerous restrictions. For example, the attendees of the webinar may be restricted such that they can only receive audio and video streams from the webinar but cannot contribute content to the webinar without approval from the host and/or panelist. In other words, during a webinar, video conference provider 310 receives multimedia streams from the webinar host client device 330 and from any other participant designated as a presenter, co-host, panelist, (e.g., panelists client device 352 and 354) etc.; however it does not receive such streams from attendees (except in limited circumstances in some examples, such as if a attendee is authorized by a host to ask a question), or it may receive attendee streams, but not provide them to other client devices.

In addition to the above restrictions, attendees may not have permission to access the backstage 350. As illustrated by FIG. 3B, webinar attendee client devices 340-340m may only receive multimedia streams from mainstage 365. And, if granted permission, video and audio streams from webinar attendee client devices 340-340m may be received by video conference provider 310 and transmitted to other participants of mainstage 365.

Unlike attendees, panelists and hosts may have permission to access the backstage 350. In backstage 350, panelist client devices 352 and 354, and host client device 330 may receive audio and video streams from both mainstage 365 and backstage 350. Participants in backstage 350 are able to interact with the other participants in backstage 350, such as by providing audio and video feeds and receiving audio and video feeds from other backstage 350 participants. Participants in backstage 350, however, cannot interact with participants of mainstage 365. In other words, participants in the backstage 350 can talk and share content with each other in backstage 350 without attendees of the webinar in mainstage 365 being involved.

A panelist may remain in backstage 350 until it is time for the panelist to present on mainstage 365. When it is time to present, the panelist may move to mainstage 365. Moving between mainstage 365 and backstage 350 is described in more detail below.

To present content to the participants, a webinar panelist client device 352 may present content to the participants, such as presentation material stored on the data store 332, through a video feed containing such presentation material or using a video feed of the presenter itself (or multiple such video feeds). In some embodiments, the webinar may include multiple presenters or multiple panelists, such as in a panel discussion or as co-presenters. In such cases, video and audio feeds may be provided by other panelist client devices, for example webinar panelist client device 354.

A panelists may be assigned a presenter or panelist role prior to the start of the webinar. For example, the host or video conference provider 310 may assign a participant a panelist role in the meeting invitation. In other cases, the host may assign a participant a panelist role during the webinar. When a participant is assigned a panelist or host role, some or all of the restrictions placed on the participant may be removed depending on the restrictions set for the newly-assigned role.

Figure 4:
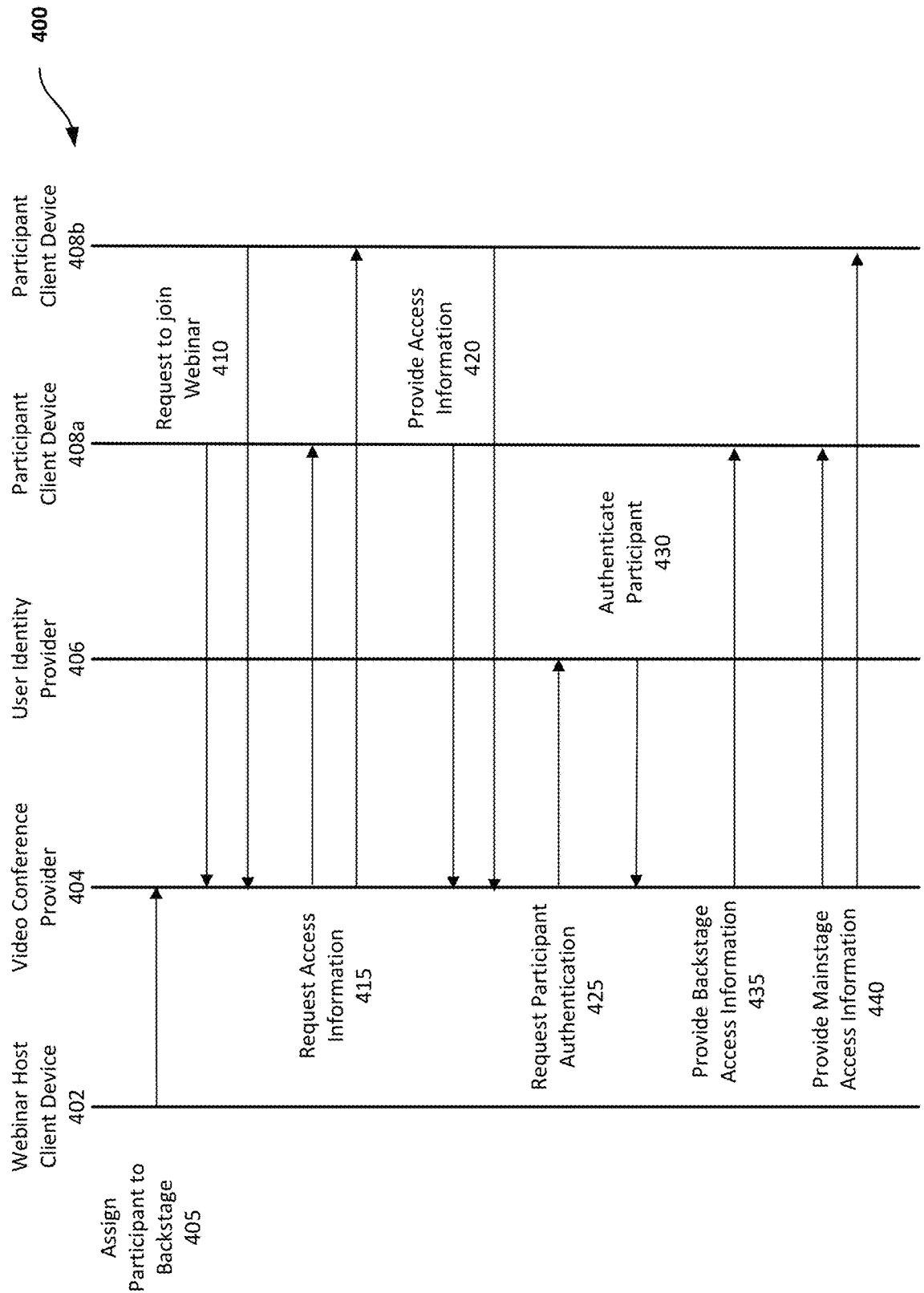
FIG. 4 shows an example sequence of events for providing a webinar backstage during a webinar event, according to an embodiment herein.

Referring now to FIG. 4, FIG. 4 shows an example sequence 400 of events for providing a webinar backstage during a webinar event. Sequence 400 is described with respect to a system that includes a video conference provider 404, a user identity provider 406, a webinar host client device 402, and a participant client devices 408a and 408b. While participant client devices 408a and 408b are discussed with respect to FIG. 4, it should be appreciated that any number of participant client devices may participate in the sequence. Further, sequence 400 assumes that webinar host client device 402 and participant client devices 408a and 408b are all participating in the same on-going webinar hosted by video conference provider 404.

At some time before or during the webinar, the host may assign a participant to a webinar backstage (405). To assign a participant to the backstage, the host may assign the role of the participant as a host or a panelist prior to the webinar. For example, the role of the participant may be assigned as part of the meeting information when the webinar invitation is distributed by the host. In such an example, video conference provider 404 may receive and store information relating to a participant's role in the webinar. In other embodiments, the host may assign or change a participant's role during a webinar. In such cases, video conference provider 404 can actively update the participant's role or access information when the host makes the change/assignment.

To join the webinar, participant client device 408a may transmit a request to join the webinar to video conference provider (410). In response to the request to join the webinar, video conference provider 404 may request access information from participant client device 408a (415). The request for access information from the participant client device 408a may include a request for meeting information, such as for example, meeting ID, password, and identification information. Identity information may include information associated with the identity of the user of the participant client device 408a, such as a username, an email address, an account identifier, a device name, a device ID, a telephone number, etc. In different examples, different types of identity information may be provided. The participant's role in the webinar may be included in the access information. Participant client device 408*b* may request to join the webinar via the same or similar steps (410) and (415).

In response to the request for access information (415), participant client devices 408*a* and 408*b* may provide access information to video conference provider 404 (420). In some embodiments, access information may be transmitted as part of the request to join the webinar (410). In such cases, the above steps (415) and (420) would not be part of sequence 400.

Video conference provider 404 may request participant authentication after receiving the access information from participant client devices 408*a* and 408*b* (425). When the video conference provider 404 receives the request for the access information, the video conference provider 404 confirms the role of the participant and identity of the participant. As noted above, in some embodiments a host may provide a participant with permission to join the backstage. In such cases, upon granting permission, the client device associated with the participant may receive updated access information. The updated access information may include permission for the participant to have access to the backstage. In such cases, the video conference provider may use the identity of the participant or other information relating to the participant to grant access to the backstage instead of the role of the participant.

Video conference provider 404 may attempt to authenticate the user of the participant client device 408*a* (or simply the participant client device 408*a* itself). To do so, video conference provider 404 may transmit a request to authenticate the participant to a user identity provider 406 (425), generally as described above with respect to FIGS. 1 and 2. In response, the user identity provider 406 responds, in this example, that the participant has been authenticated (430). In response to receiving the authentication, the video conference provider 404 transmits access information to participant client device 408*a* to enable it to join the backstage, such as by subscribing to one or more multimedia streams associated with the backstage, or obtain cryptographic keys to enable access to one or more multimedia streams of the backstage (435). The participant client device 408*a* can then join the backstage using the supplied access information.

Video conference provider 404 may also transmit access information to participant client device 408*a* to enable it to join the mainstage, such as subscribing to one or more multimedia streams associated with the mainstage, or obtain cryptographic keys to enable access to one or more multimedia streams of the mainstage (440). In some embodiments, when video conference provider 404 transmit access information to the participant client device 408*a* to enable it to join the backstage, video conference provider 404 may also transmit access information to enable the participant client device 408*a* to join the mainstage.

In cases where the participant is an attendee of the webinar and does not have permission to access the backstage, at step (435), video conference provider 404 may transmit access information for the webinar mainstage. For example, as illustrated, the user of participant client device 408*b* may be an attendee without access to the backstage. In this case, video conference provider 404 may provide mainstage access information to participant client device 408*b* (440). The mainstage access information may enable participant client device 408*b* to join the mainstage, such as by subscribing to one or more multimedia streams associated with the mainstage, or obtain cryptographic keys to enable access to one or more multimedia streams of the mainstage. As noted above, participants who join the mainstage only have access to the multimedia streams associated with the mainstage and do not have access to the multimedia streams of the backstage. Thus, participant client device 408*b* would not receive multimedia streams from the backstage.

As mentioned above, the sequence 400 shown in FIG. 4 need not be performed as sequential steps, but instead, certain Examples may be performed asynchronously to others. For example, if multiple different client devices are attempting to join the backstage, each may progress through a sequence similar to sequence items 425-435, if the client is authenticated, or through a sequence similar to sequence items 425, 430, and 440, if the client is not authenticated, independently of the sequence items performed by other clients. Similarly, while this example illustrates the use of sequence items to authenticate participants, some examples may omit authentication. Thus, the system may restrict a client device to only joining the mainstage, but it may not otherwise attempt to authenticate the participant using the client device. Additionally, while the above steps 405-425 are discussed with respect to both participant client devices 408*a* and 408*b*, the steps may be performed independently for each client device.

As described above, the backstage can provide a space for a panelist or presenter to prepare before joining the mainstage and presenting. For example, a panelist can adjust a virtual background, perform an audio and video check, or merely check-in with other panelist before joining the mainstage. In some cases, panelists may convene in the backstage before the webinar is starts or is "On Air" to discuss the upcoming webinar event. A panelist in the backstage may be presented with various video conference functionality, including the ability to transfer between the mainstage and backstage.

Figure 5:
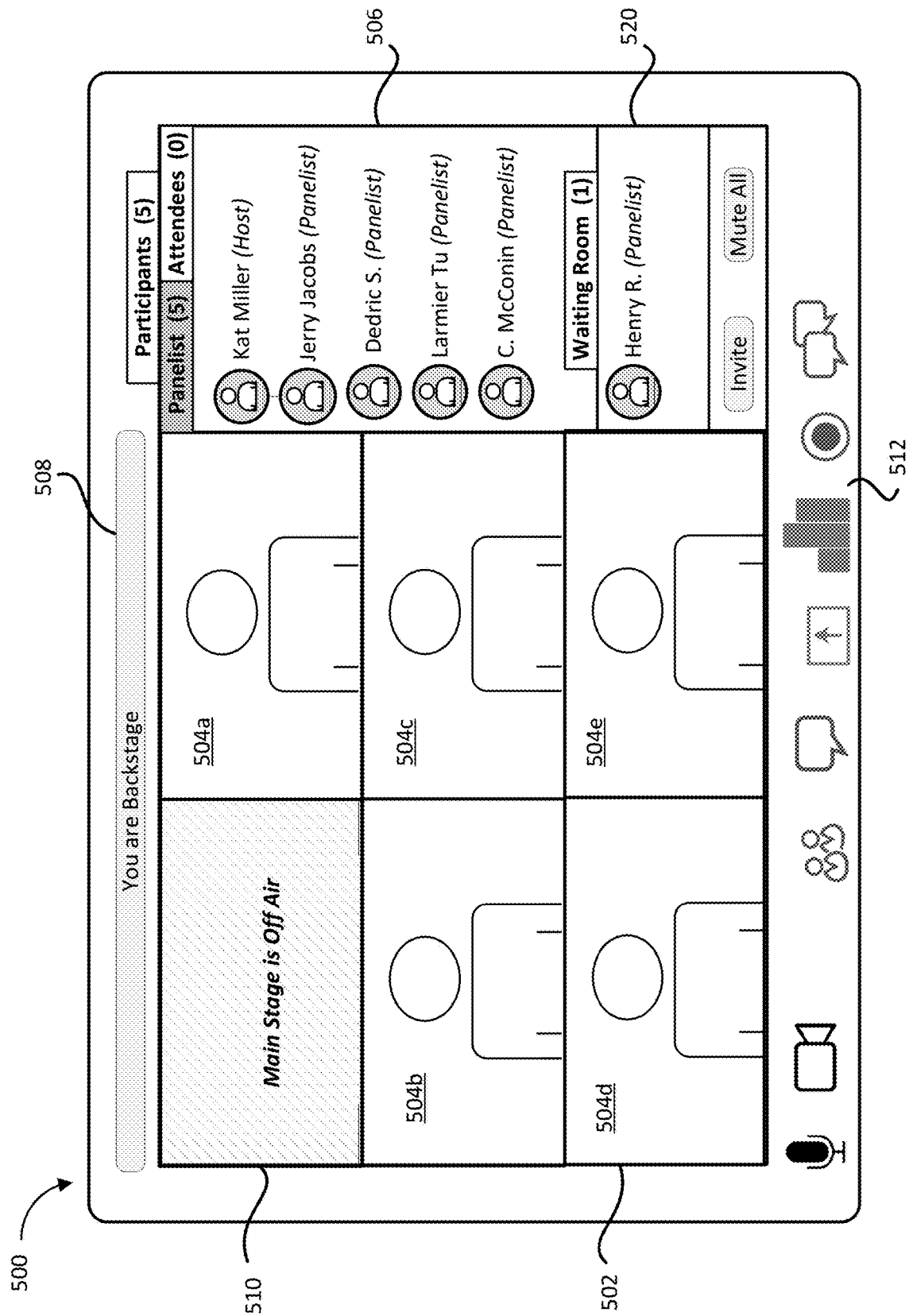
FIG. 5 illustrates an graphical user interface for the backstage prior to a webinar main event, according to an embodiment herein.

Referring now to FIG. 5, FIG. 5 illustrates a GUI 500 for the backstage prior to a webinar main event according to an embodiment. The GUI 500 may be presented to a participant, such as a panelist or a host, in a backstage webinar, such as backstage 350. The GUI 500 of FIG. 5 will be described with respect to systems shown in FIGS. 3 and 4, however, any suitable system according to this disclosure may be employed.

The GUI 500 may be viewable to a participant of the webinar backstage 350, such as the participant corresponding to client device 408*a*. Presentation of the GUI 500 on the participant's client device may be in response to initiation of the webinar or acceptance of a request to enter backstage 350. Participants who do not have permission to the webinar backstage 350, for example attendees that are part of the mainstage 365, may not view GUI 500.

The GUI 500 may include a display 502 which provides video and audio streams from other participants of the webinar. When the participant is in the backstage 350, the GUI 500 may display the video and audio streams from the other participants 504*a*-504*e* in the backstage 350. Participants 504*a*-504*e* may be hosts, panelists, or other participants who have been granted permission to access the backstage 350.

The GUI 500 may include participant status indicator 508. Participant status indicator 508 may indicate to the participant that it is backstage. The indicator 508 may indicate the status of the webinar event and/or the "location" of the participant within the webinar event (e.g., in the backstage 350 or in the mainstage 365). The status indicator 508 may be helpful for a panelist who is transferring back and forth between the backstage 350 and the mainstage 365 during the webinar event. The status indicator 508 may orient the panelist as to which stage the panelist is streaming from, and thereby indicating the audience receiving the panelist's audio and video streams.

The GUI 500 may include a participant list or roster 506 that displays information relating to the participants of the webinar. For example, the participant list 506 may display the name and/or image of the participants 504a-504e. In some embodiments, the participant list 506 may include a picture, image, representation, or a listening of participants. In some embodiments, the participant's role in the webinar may also be displayed next to the participant's name. When a participant joins the backstage 350, the joining participant may be added to the participant list 506.

The participant list 506 may include separate tabs/views for viewing participants of the backstage 350 and participants of the mainstage 365. In some embodiments, the participant list 506 may be divided to show participants who have access to the backstage, such as panelists and hosts, and show participants who are restricted to the mainstage, such as mainstage 365 (e.g., attendees). The participant list 506 may include a participant count see how many participants are present on the mainstage 365.

In some embodiments, there may be a waiting room for participants prior to joining the backstage 350. For example, instead of automatically entering the backstage 365 when joining the webinar, a participant may first be placed in a waiting room until a host or other participant with authority accepts the participant into the backstage 365. In embodiments where a waiting room is part of the webinar ecosystem, the GUI 500 may include a waiting room list 520. The waiting room list 520 may list participants in the waiting room. A host or other participant with authority may invite or accept participants in the waiting room into the backstage 365 as desired. As participants join the waiting room, the host or other participant with authority may receive a notification. In some cases, only hosts or participants with authority may have a GUI 500 including the waiting room list 520. Other backstage participants 504a-504e may not view or be aware of participants in the waiting room.

As participants join the backstage 350, the host may receive a notification. For example, the GUI 500 for a host may include a visual indicator, sound, or any other indication which notifies the host that a participant has joined the backstage 350. Notifying the host that a participant entered the backstage 350 may allow the host to know the panelist is available to present on the mainstage 365. In some cases, the other participants in the backstage may not receive notifications as participants join the backstage 350 outside of seeing an updated participant list 506.

The GUI 500 illustrated in FIG. 5 may depict the backstage 350 prior to the main webinar event going 'Live' or 'On Air.' The main webinar event may be considered 'Live' or 'On Air' once the webinar starts for attendees or a first presenter or panelist begins presenting. The GUI 500 may include an event status indicator 510. The event status indicator 510 may indicate the status of the webinar main event. Prior to the main webinar event going 'Live,' the event status indicator 510 may indicate that the mainstage is 'Off Air.' Once the main event goes 'Live,' the event status indicator 510 updates to indicate that the main event is 'On Air'. Other event status that may be displayed by event status indicator 510 include 'event open,' 'intermission,' event not broadcasting, 'testing broadcast,' 'transitioning live,' 'post-event broadcasting,' or 'debriefing.' In some cases, the event status indicator 510 may indicate the amount of time until the event goes 'Live.'

In some embodiments, the event status indicator 510 may display different status based on a participant's role. For example, if GUI 500 is presented on the host client device 330, then the event status indicator 510 may display an event status than if the GUI 500 is presented on the panelists client device 352. In other words, host(s) and panelist(s) of webinar may receive different event status on event status indicator 510.

The GUI 500 may also include a dashboard 512 that contains one or more action selections. For example, the dashboard 512 can include a recording selection that allows a participant to record the streams of audio and video during the webinar. The dashboard 512 may include functions that allow participants in the backstage 350 to communicate with participants in the mainstage 365. For example, dashboard 512 may include a chat message option, a polling selection, a 'Q and A' selection, and similar functions.

In some embodiments, the chat message option may be limited to chat message communication between backstage participants. For example, only participants in the backstage 350 can send and receive chat messages. In other embodiments, participants in the backstage 350 can chat with attendees on the mainstage 365. In cases where backstage participants can chat message with attendees on the mainstage 365 and other backstage participants, there may be a clear indication of who is receiving the chat messages. For example, although not shown, a chat message box may have different tabs or sections designated for sending messages to only backstage participants and only sending messages to mainstage attendees.

Figure 6:
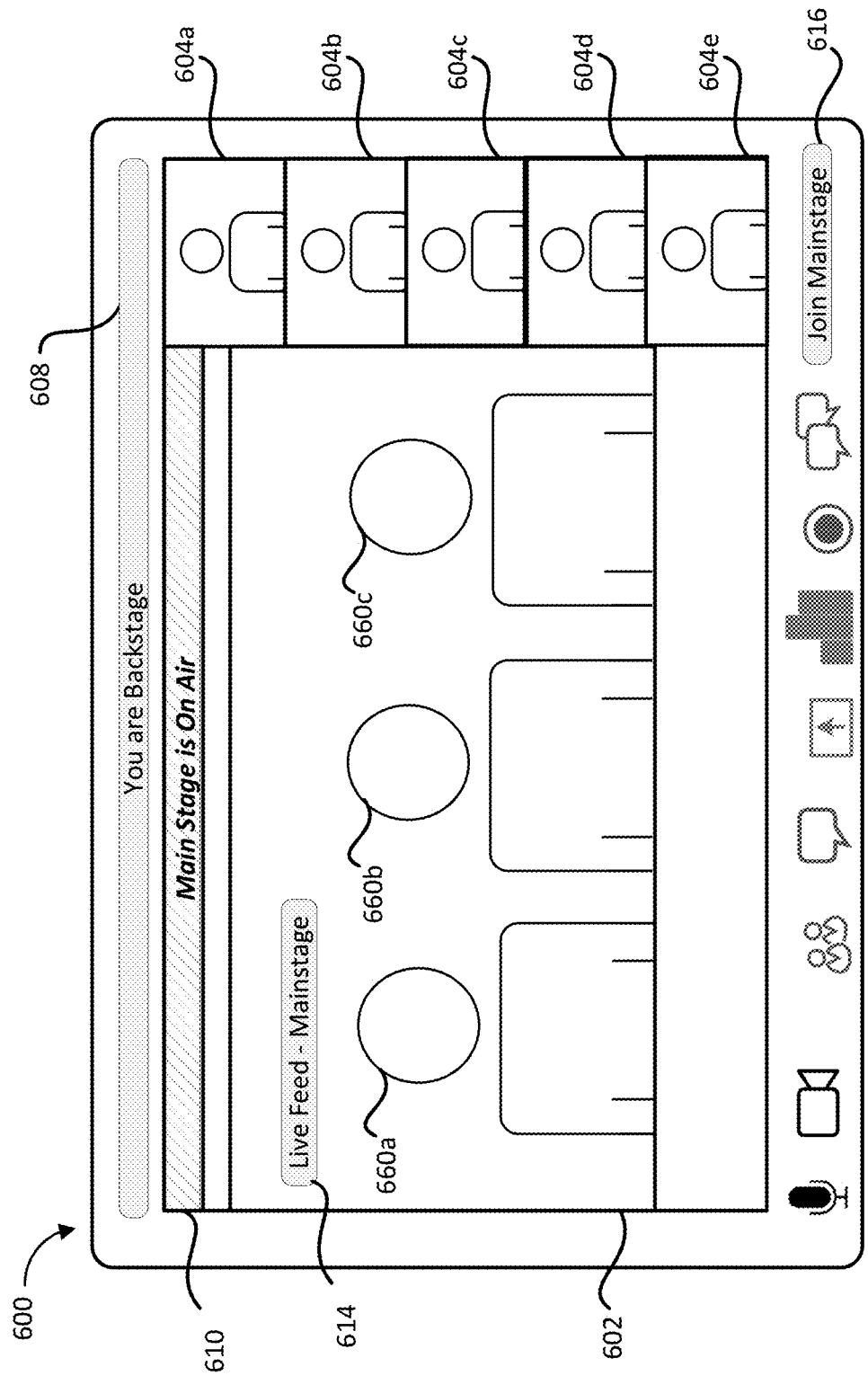
FIG. 6 illustrates an graphical user interface for the backstage after the webinar main event starts, according to an embodiment herein.

Referring now to FIG. 6, FIG. 6 illustrates a GUI 600 for the backstage after the webinar main event starts according to an embodiment. The GUI 600 may be the same as the GUI 500 except that the webinar main event has started. For example, the GUI 600 may include a display 602 which provides video and audio streams from other participants of the webinar. When the webinar main event goes 'Live' or otherwise starts, the display 602 may include video and audio streams from the mainstage 365. For example, the display 602 may provide video and audio streams from presenters 660a, 660b, and 660c from the webinar mainstage 365.

In some embodiments, the GUI 600 may also include video and audio streams from the other participants 604a-604e in the backstage 350. The participants 604a-604e may be the same as participants 504a-504e from the GUI 500. Although display 602 provides video and audio streams from the mainstage 365, participants in the backstage 350 may communicate (e.g., exchange audio and video streams) between other participants in the backstage 350 without interrupting the webinar main event. For example, the participant 604a may talk to participants 604b-604e while the panelists 660a-660c present to an audience on the mainstage 365. While the other backstage participants 604b-604e can hear and see participant 604a, the audience and panelists 660a-660c on the mainstage 365 do not receive the video and audio streams from participant 604a.

To provide a clear indication that a participant is in the backstage 350, the GUI 600 may include a status indicator 608. As shown, status indicator 608 may indicate that the participant is backstage. When the participant transitions to the mainstage 365, the status indicator 608 may then indicate that the participant is on the mainstage 365.

The GUI 600 may also include an event status indicator 610. The event status indicator 610 may be the same as the event status indicator 610. As illustrated in FIG. 6, the webinar event is 'Live' and thus the event status indicator 610 indicates that the "Mainstage is On Air. When the mainstage is 'On Air,' attendees of the mainstage webinar may receive audio and video streams from the host and/or one or more panelists. The event status indicator 610 may include various other event status, as discussed above.

In addition to the event status indicator 610, the GUI 600 may include a feed indicator 614. Feed indicator 614 may indicate that the video and audio streams displayed on display 602 are live feeds from the mainstage 365. In some embodiments, display 602 may only display the audio and video streams from the other backstage participants 604a-604e. In such cases, the feed indicator 614 may indicate that the video and audio streams displayed on display 602 is a live feed from the backstage 350. It is understood that the video streams from the other backstage participants 604a-604e and the video stream from the mainstage can be displayed in any arrangement.

Since the backstage participants 604a-604e can receive audio from both the backstage 350 and the mainstage 365, the GUI 600 may include volume control for both audio streams (not shown). A backstage participant can control the volume from the mainstage audio and the volume from the backstage audio independently. This allows a backstage participant to listen to one or both audio streams as desired. For example, a backstage participant may want to listen to the panelists 660a-660c and not the backstage participants 604a-604e. The volume controls would allow the backstage participant to put the volume of the backstage audio to zero (e.g., mute) while listening to the mainstage audio.

The GUI 600 may include a transition selection 616. The transition selection 616 may allow a backstage participant to transition to the mainstage 365. When a participant selects the transition selection 616, the backstage participant may transition to the mainstage 365. When transitioned to the mainstage, the participant would no longer receive video and audio streams from the other backstage participants 604a-604e. In some embodiments, a host or other participant with authority, may transition a participant from the backstage 350 to the mainstage 365 without the participant selecting the transition selection 616. In some cases, a host may transition an attendee from the mainstage 365 to the backstage 350.

When transitioned to the mainstage 365, the participant may be considered one of the attendees until promoted to the 'stage.' In other words, the participant may be in the mainstage 365, however, the participant may not be able to transmit audio and video streams from its respective client device to the other attendees until promoted to the 'stage.' Once promoted to the 'stage,' the participant may present to the attendees. A host or other participant with authority may promote one or more participants to the 'stage.' In other cases, the participant may have control to go on 'stage' as needed.

In other embodiments, when the participant is transitioned from the backstage 350 to the mainstage 365, the participant may automatically be promoted to the 'stage.' The automatic promotion to the 'stage' may be due to the participant's role as a panelist or host.

Figure 7:
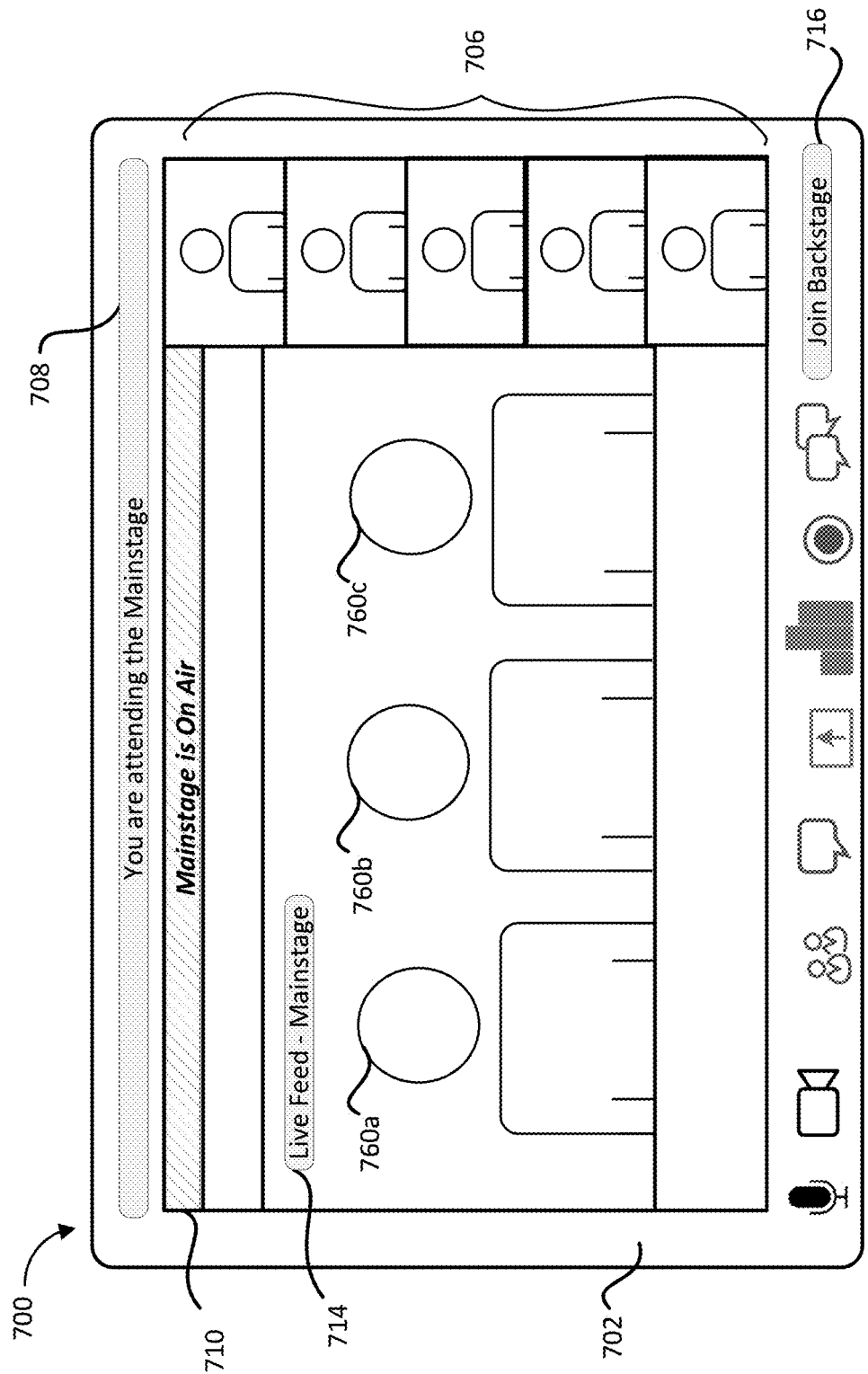
FIG. 7 illustrates an graphical user interface for the mainstage, according to an embodiment herein.

Referring now to FIG. 7, FIG. 7 illustrates a GUI 700 for the mainstage according to an embodiment. The GUI 700 may be the same as GUI 600 except that the participant has transitioned to the mainstage 365. For example, GUI 700 may include a display 602 which provides video and audio streams from other participants of the webinar. When the webinar main event goes 'Live' or otherwise starts, the display 702 may include video and audio streams from the mainstage 365. For example, the display 702 may provide video and audio streams from presenters 760a, 760b, and 760c from the webinar mainstage 365. Presenters 760a, 760b, and 760c may be the same as presenters 660a, 660b, and 660c.

When a participant enters the mainstage 365, a status indicator 708 may indicate that the participant is attending the mainstage. The status indicator 708 may be the same as the status indicator 608. In some embodiments, attendees of the mainstage 365 may not be presented with the status indicator 708. The attendees may not be aware of the backstage 350 and thus there is no need for the status indicator 708.

All participants of the mainstage 365, however, may be presented with a feed indicator 714. The feed indicator 714 may be the same as the feed indicator 614 and indicate the audio and video streams presented on display 702. As shown, the feed indicator 714 may indicate that the audio and video streams displayed on display 702 are live feed from the mainstage 365. In some cases, a prerecording may be presented on display 702 and the feed indicator 714 may indicate that the feed is recorded.

Participants of the mainstage 365 may be able to view a participant list 706. The participant list 706 may be similar to the participant list 506, however, the participant list 706 may not include or otherwise indicate participants who are in the backstage 350. As shown, the participant list 706 may depict a representation of a corresponding participant, such as an image, icon, or name. The participant list 706 may include attendees of the webinar in addition to the panelists or hosts who have transitioned to the mainstage 365. In some embodiments, the GUI 700 may not include the participant list 706.

The GUI 700 may also include a transition selection 716. Transition selection 716 may be the same as 616 except it allows participants with permissions (e.g., panelists, hosts, co-hosts, etc.) to transition from the mainstage 365 to the backstage 350.

In some embodiments, once a webinar event is completed a host may end the mainstage event for attendees but continue the backstage 350. For example, the host may end the webinar for attendees and invite or transition panelists to the backstage 365 for a debriefing session after the webinar event. In some embodiments, once the mainstage 365 is closed, all panelists may automatically be joined into the backstage 350.

When a host is ending an event, the status of the event may be made clear using the event status indicators 610 or 710, depending on whether the participant is in the backstage 350 or the mainstage 365. In some embodiments, ending the event may be a two-click experience. For example, the host may select "End Broadcast" and all attendees are disconnected (e.g., the mainstage is closed). Once the host selects "End Broadest" (or equivalent), hosts and panelists are transitioned into the backstage 350. When it is time to close the backstage 350, thereby ending the webinar event for all participants, the host may then select "End Webinar." Upon this selection. The webinar may be closed and participants in the backstage may be disconnected.

Figure 8:
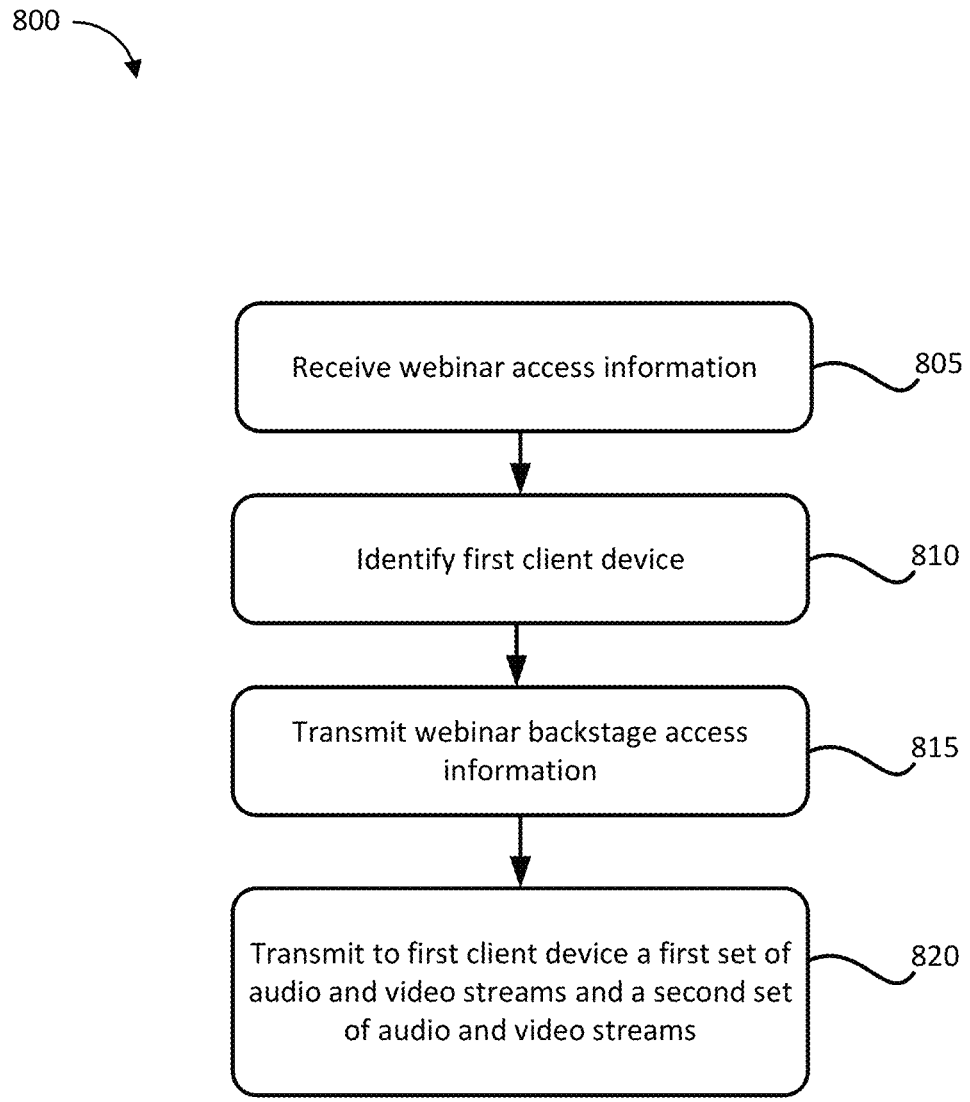
FIG. 8 depicts an exemplary method for providing a webinar backstage, according to an embodiment herein.

Referring now to FIG. 8, FIG. 8 shows an example method 800 for providing a webinar backstage, such as webinar backstage 350 discussed above. The method 800 of FIG. 8 will be described with respect to systems shown in FIGS. 3A and 3B, however any suitable system according to this disclosure may be employed, including any of the systems or features shown in FIGS. 1-2 and 4-6.

At block 805, a video conference provider may receive webinar access information from a first client device. For example, the video conference provider 310 may receive webinar access information from the panelist client device 352.

At block 810, the video conference provider 310 may identify the first client device based on the webinar access information. For example, the video conference provider 310 may identify the first client device as the panelist client device 352. The video conference provider may identify the first client device or the participant using the first client device based on the webinar access information.

At block 815, the video conference provider 310 may transmit webinar backstage access information to the first client device. In some embodiments, the video conference provider 310 may transmit, to the first client device, the webinar backstage access information based on identifying the first client device using the webinar access information. For example, the webinar access information may include identification of a participant corresponding to the first client device, and a role of the participant in the webinar. As discussed above, only certain participants may have access to the webinar backstage 350. In some embodiments, only participants with a role in the webinar event such as host, co-host, and panelist may have access to the webinar backstage 350.

At block 820, the video conference provider 310 may transmit to the first client device a first set of audio and video streams corresponding to a webinar mainstage 365 and a second set of audio and video streams corresponding to a webinar backstage 350. In some embodiments, the video conference provider 310 may transmit the first set of audio and video streams and the second set of audio and video streams to the first client device upon identifying the first client devices as corresponding to a panelist, host, or co-host role in the webinar event. Once in the webinar backstage 350, the first client device may exchange audio and video streams with other participants in the webinar backstage 350. For example, the video conference provider 310 may receive, from the first client device, an audio stream and a video stream. The audio stream and the video stream from the first client device may be transmitted as part of the second set of audio and video streams to multiple client devices in the webinar backstage 350.

In some embodiments, the first client device may transition from the backstage 350 to the mainstage 365. In such cases, the video conference provider 310 may receive, from the first client device, a presentation indication. The presentation indication may indicate that the first client device is ready to present on the webinar mainstage 365. Upon receipt of the presentation indication, the video conference provider 310 may transmit the audio stream and the video stream from the first client device as part of the first set of audio and video streams to multiple attendee client devices in the webinar mainstage 365.

If a participant does not have access to the webinar backstage 350, the video conference provider 310 may identify the second client device as an attendee of the webinar upon receiving webinar access information from the second client device. The video conference provider 310 may transmit webinar mainstage access information to the second client device and transmit the first set of audio and video streams corresponding to the webinar mainstage 365 to the second client device. Because the second client device corresponds to a participant who does not have access to the webinar backstage 350, the second client device may not receive the second set of audio and video streams corresponding to the webinar backstage 350 unless granted permission otherwise by a host or co-host.

Figure 9:
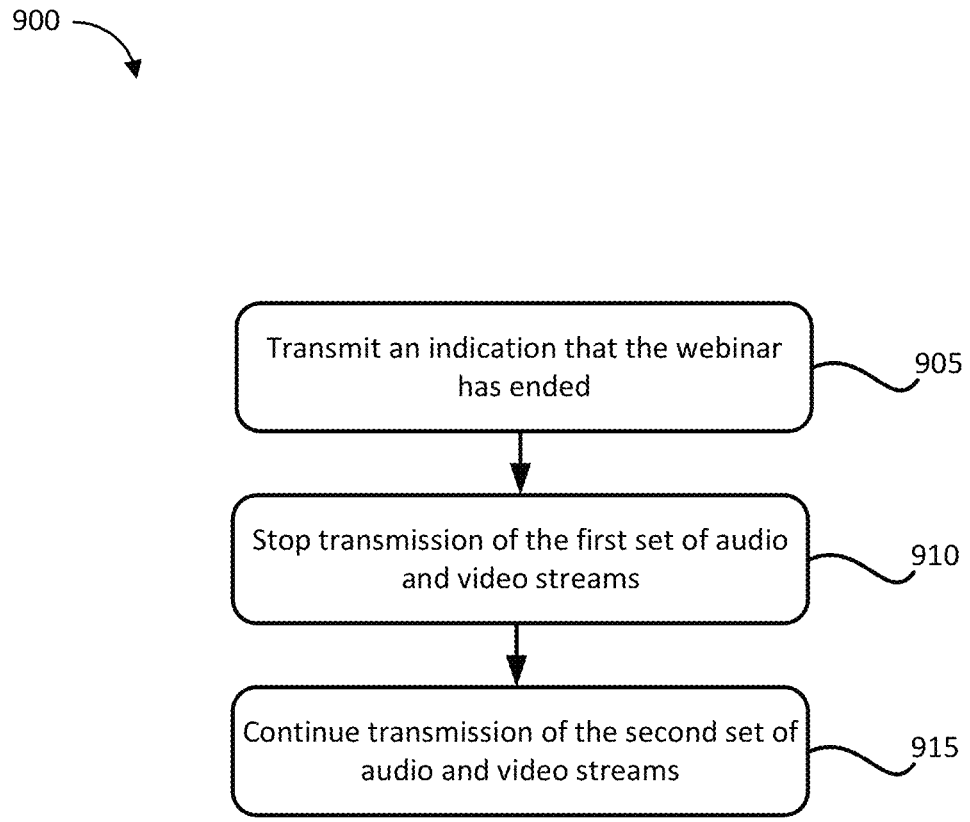
FIG. 9 depict an exemplary method for ending a webinar mainstage, according to an embodiment herein.

Referring now to FIG. 9, FIG. 9 shows an example method 900 for ending a webinar mainstage, according to an embodiment herein. The method 900 of FIG. 9 will be described with respect to systems shown in FIGS. 3A and 3B, however any suitable system according to this disclosure may be employed, including any of the systems or features shown in FIGS. 1-2 and 4-6.

At block 905, a video conference provider, such as video conference provider 310, may transmit an indication that the webinar event is ending or has ended. For example, a host client device may transmit a request to end the webinar event for the webinar mainstage participants to the video conference provider. In response to that request, the video conference provider 310 may transmit an indication to attendees of the webinar mainstage 365 that the webinar event has ended.

At block 910, the video conference provider 310 may stop transmission of the first set of audio and video streams to all participants of the webinar event. Attendees of the webinar mainstage 365 may be disconnected from the webinar at this point. Panelists, hosts, co-hosts, and other participants with access, however, may be transitioned to the webinar backstage 350. At block 915, the video conference provider may continue transmission of the second set of audio and video streams to participants that were transitioned to the webinar backstage 350.

When it is time to tend the webinar event for all participants, the video conference provider 310 may stop transmission of the second set of audio and video streams to the participants in the webinar backstage 350 and disconnect all participants. In some embodiments, the video conference provider 310 may receive a request to end the webinar event from a host or co-host client device. In other embodiments, the webinar event may end at a set time or duration.

Figure 10:
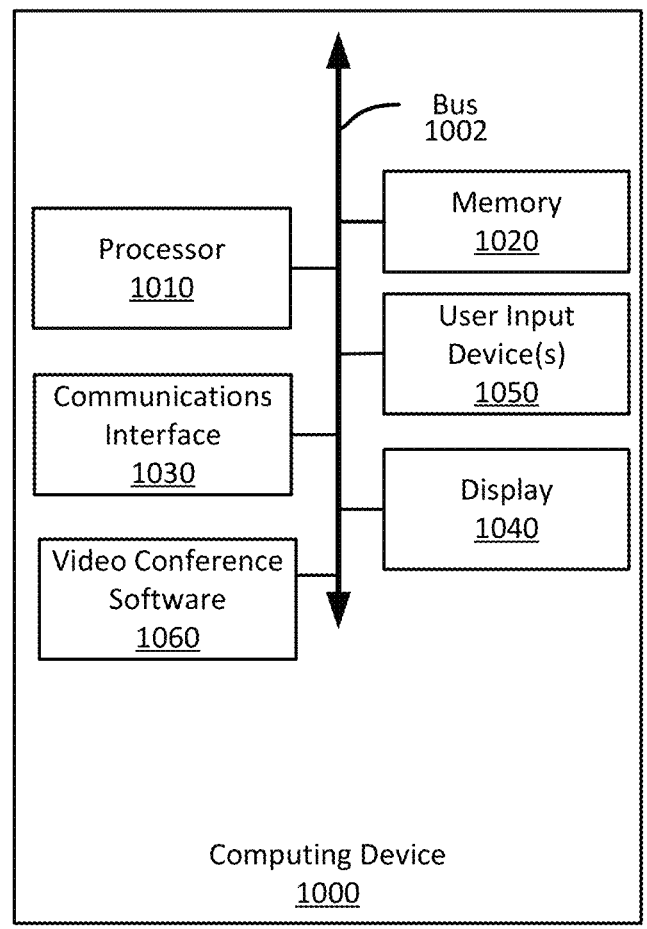
FIG. 10 shows an example computing device suitable for use with example systems and methods for providing a webinar backstage during a webinar event, according to this disclosure.

Referring now to FIG. 10, FIG. 10 shows an example computing device 1000 suitable for use in example systems or methods for providing a webinar backstage during a webinar event. according to this disclosure. The example computing device 1000 includes a processor 1010 which is in communication with the memory 1020 and other components of the computing device 1000 using one or more communications buses 1002. The processor 1010 is configured to execute processor-executable instructions stored in the memory 1020 to perform one or more methods for providing a webinar backstage during a webinar event. according to different examples, such as part or all of the example method 800 described above with respect to FIG. 8, or example method 900 described above with respect to FIG. 9. The computing device 1000, in this example, also includes one or more user input devices 1050, such as a keyboard, mouse, touchscreen, microphone, etc., to accept user input. The computing device 1000 also includes a display 1040 to provide visual output to a user.

In addition, the computing device 1000 includes video conference software 10100 to enable a user to join and participate in a video conference, such as a conventional meeting or webinar, by receiving multimedia streams from a video conference provider, sending multimedia streams to the video conference provider, joining and leaving a mainstage or backstage, such as described throughout this disclosure, etc.

The computing device 1000 also includes a communications interface 1030. In some examples, the communications interface 1030 may enable communications using one or more networks, including a local area network ("LAN"); wide area network ("WAN"), such as the Internet; metropolitan area network ("MAN"); point-to-point or peer-to-peer connection; etc. Communication with other devices may be accomplished using any suitable networking protocol. For example, one suitable networking protocol may include the Internet Protocol ("IP"), Transmission Control Protocol ("TCP"), User Datagram Protocol ("UDP"), or combinations thereof, such as TCP/IP or UDP/IP.

While some examples of methods and systems herein are described in terms of software executing on various machines, the methods and systems may also be implemented as specifically-configured hardware, such as field-programmable gate array (FPGA) specifically to execute the various methods according to this disclosure. For example, examples can be implemented in digital electronic circuitry, or in computer hardware, firmware, software, or in a combination thereof. In one example, a device may include a processor or processors. The processor comprises a computer-readable medium, such as a random access memory (RAM) coupled to the processor. The processor executes computer-executable program instructions stored in memory, such as executing one or more computer programs. Such processors may comprise a microprocessor, a digital signal processor (DSP), an application-specific integrated circuit (ASIC), field programmable gate arrays (FPGAs), and state machines. Such processors may further comprise programmable electronic devices such as PLCs, programmable interrupt controllers (PICs), programmable logic devices (PLDs), programmable read-only memories (PROMs), electronically programmable read-only memories (EPROMs or EEPROMs), or other similar devices.

Such processors may comprise, or may be in communication with, media, for example one or more non-transitory computer-readable media, that may store processor-executable instructions that, when executed by the processor, can cause the processor to perform methods according to this disclosure as carried out, or assisted, by a processor. Examples of non-transitory computer-readable medium may include, but are not limited to, an electronic, optical, magnetic, or other storage device capable of providing a processor, such as the processor in a web server, with processor-executable instructions. Other examples of non-transitory computer-readable media include, but are not limited to, a floppy disk, CD-ROM, magnetic disk, memory chip, ROM, RAM, ASIC, configured processor, all optical media, all magnetic tape or other magnetic media, or any other medium from which a computer processor can read. The processor, and the processing, described may be in one or more structures, and may be dispersed through one or more structures. The processor may comprise code to carry out methods (or parts of methods) according to this disclosure.

EXAMPLES

These illustrative examples are mentioned not to limit or define the scope of this disclosure, but rather to provide examples to aid understanding thereof. Illustrative examples are discussed above in the Detailed Description, which provides further description. Advantages offered by various examples may be further understood by examining this specification As used below, any reference to a series of examples is to be understood as a reference to each of those examples disjunctively (e.g., "Examples 1-4" is to be understood as "Examples 1, 2, 3, or 4").

Example 1 is a method comprising: receiving, from a first client device, webinar access information; identifying the first client device based on the webinar access information; transmitting, to the first client device, webinar backstage access information; and transmitting to the first client device: a first set of audio and video streams corresponding to a webinar mainstage; and a second set of audio and video streams corresponding to a webinar backstage.

Example 2 is the method of any previous or subsequent Example, wherein transmitting, to the first client device, the webinar backstage access information is based on identifying the first client device using the webinar access information.

Example 3 is the method of any previous or subsequent Example, wherein the webinar access information comprises: identification of a participant corresponding to the first client device; and a role of the participant in the webinar.

Example 4 is the method of any previous or subsequent Example, further comprising: transmitting, to the first client device, an indication that the webinar has ended; stopping transmission, to the first client device, of the first set of audio and video streams corresponding to the webinar mainstage; and continuing transmission, to the first client device, of the second set of audio and video streams corresponding to the webinar backstage.

Example 5 is the method of any previous or subsequent Example, further comprising: receiving, from the first client device, an audio stream and a video stream, wherein the audio stream and the video stream are transmitted as part of the second set of audio and video streams to a plurality of client devices in the webinar backstage.

Example 6 is the method of any previous or subsequent Example, further comprising: receiving, from the first client device, a presentation indication; and transmitting the audio stream and the video stream from the first client device as part of the first set of audio and video streams to a plurality of attendee client devices the webinar mainstage.

Example 7 is the method of any previous or subsequent Example, further comprising: receiving, from a second client device, webinar access information; identifying the second client device as an attendee of the webinar; transmitting, to the second client device, webinar mainstage access information; and transmitting, to the second client device, the first set of audio and video streams corresponding to the webinar mainstage, wherein the second client device does not receive the second set of audio and video streams corresponding to the webinar backstage.

Example 8 is a system comprising: a non-transitory computer-readable medium; a communications interface; and a processor communicatively coupled to the non-transitory computer-readable medium and the communications interface, the processor configured to execute processor-executable instructions stored in the non-transitory computer-readable medium to: receive, from a first client device, webinar access information; identify the first client device based on the webinar access information; transmit to the first client device webinar backstage access information; and transmit to the first client device: a first set of audio and video streams corresponding to a webinar mainstage; and a second set of audio and video streams corresponding to the webinar backstage.

Example 9 is the system of any previous or subsequent Example, wherein the processor configured to execute further processor-executable instructions stored in the non-transitory computer-readable medium to: identify a participant corresponding to the first client device; determine a role of the participant in the webinar; and transmit to the first client device the webinar backstage access information based on the role.

Example 10 is the system of any previous or subsequent Example, wherein the processor is configured to execute further processor-executable instructions stored in the non-transitory computer-readable medium to: receive an audio stream and a video stream from the first client device; and transmit the audio stream and the video stream from the first client device to a plurality of client devices in the webinar backstage.

Example 11 is the system of any previous or subsequent Example, wherein the processor is configured to execute further processor-executable instructions stored in the non-transitory computer-readable medium to: receive an indication to transition the first client device to the webinar mainstage from the webinar backstage; transmit, in response to the indication to transition the first client device to the webinar mainstage, a presentation indication to the first client device; and transmit an audio stream and the video stream from the first client device as part of the first set of audio and video streams to a plurality of attendee client devices in the webinar mainstage.

Example 12 is the system of any previous or subsequent Example, wherein the processor is configured to execute further processor-executable instructions stored in the non-transitory computer-readable medium to: receive an indication to transition the first client device to the webinar backstage from the webinar mainstage; and discontinue transmission of the audio stream and the video stream from the first client device as part of the first set of audio and video streams to the plurality of attendee client devices in the webinar mainstage.

Example 13 is the system of any previous or subsequent Example, wherein the processor configured to execute further processor-executable instructions stored in the non-transitory computer-readable medium to: receive an indication to transition a second client device from the webinar mainstage to the webinar backstage; and transmit, in response to the indication to transition the second client device to the webinar backstage, the second set of audio and video streams corresponding to the webinar backstage.

Example 14 is a non-transitory computer-readable medium comprising processor-executable instructions configured to cause one or more processors to: receive, from a first client device, webinar access information; identify the first client device based on the webinar access information; transmit, to the first client device, webinar backstage access information; and transmit the first client device: a first set of audio and video streams corresponding to a webinar mainstage, wherein a plurality of attendee client devices receive the first set of audio and video streams from the webinar mainstage; and a second set of audio and video streams corresponding to the webinar backstage.

Example 15 is the non-transitory computer-readable medium of any previous or subsequent Example, wherein the processor is configured to execute further processor-executable instructions stored in the non-transitory computer-readable medium to: transmit, to the first client device, a status of the webinar mainstage.

Example 16 is the non-transitory computer-readable medium of any previous or subsequent Example, wherein the processor is configured to execute further processor-executable instructions stored in the non-transitory computer-readable medium to: receive, from a host client device, a request to move the first client device from the webinar backstage to the webinar mainstage; and transmit, to the plurality of attendee client devices in the webinar mainstage, an audio stream and a video stream from the first client device as part of the first set of audio and video streams.

Example 17 is the non-transitory computer-readable medium of any previous or subsequent Example, wherein the processor is configured to execute further processor-executable instructions stored in the non-transitory computer-readable medium to: stop transmitting, to the first client device, the second set of audio and video streams corresponding to the webinar backstage.

Example 18 is the non-transitory computer-readable medium of any previous or subsequent Example, wherein the processor is configured to execute further processor-executable instructions stored in the non-transitory computer-readable medium to: receive, from a second client device, webinar access information; identify the second client device based on the webinar access information; transmit, to the second client device, webinar mainstage access information; and transmit the second client device the first set of audio and video streams corresponding to a webinar mainstage.

Example 19 is the non-transitory computer-readable medium of any previous or subsequent Example, wherein the processor is configured to execute further processor-executable instructions stored in the non-transitory computer-readable medium to: receive a chat message from the first client device in the webinar backstage; and transmit the chat message in a chat message box to a plurality of client devices in the webinar backstage.

Example 20 is the non-transitory computer-readable medium of any previous or subsequent Example, wherein the processor is configured to execute further processor-executable instructions stored in the non-transitory computer-readable medium to: receive a message from the first client device in the webinar backstage; and transmit the message to the plurality of attendee client devices in the webinar mainstage.

The foregoing description of some examples has been presented only for the purpose of illustration and description and is not intended to be exhaustive or to limit the disclosure to the precise forms disclosed. Numerous modifications and adaptations thereof will be apparent to those skilled in the art without departing from the spirit and scope of the disclosure.

Reference herein to an example or implementation means that a particular feature, structure, operation, or other characteristic described in connection with the example may be included in at least one implementation of the disclosure. The disclosure is not restricted to the particular examples or implementations described as such. The appearance of the phrases "in one example," "in an example," "in one implementation," or "in an implementation," or variations of the same in various places in the specification does not necessarily refer to the same example or implementation. Any particular feature, structure, operation, or other characteristic described in this specification in relation to one example or implementation may be combined with other features, structures, operations, or other characteristics described in respect of any other example or implementation.

Use herein of the word "or" is intended to cover inclusive and exclusive OR conditions. In other words, A or B or C includes any or all of the following alternative combinations as appropriate for a particular usage: A alone; B alone; C alone; A and B only; A and C only; B and C only; and A and B and C.

That which is claimed is:

1. A method comprising:
receiving, from a first client device of a plurality of client devices, webinar access information for a webinar, wherein:
the plurality of client devices comprises:
one or more presenting client devices outputting a first set of audio and video streams; and
one or more attendee client devices outputting undistributed audio and video streams; and
the webinar comprises:
a webinar mainstage characterized by the first set of audio and video streams being accessible by the plurality of client devices; and
a webinar backstage characterized by a second set of audio and video streams accessible by a subset of the one or more presenting client devices;
identifying the first client device based on the webinar access information;
transmitting, to the first client device, webinar backstage access information;
transmitting to the first client device:
the first set of audio and video streams; and
the second set of audio and video streams;
receiving, from the first client device, a first video stream and a first audio stream; and
transmitting the first video stream and the first audio stream to the subset of the one or more presenting client devices.

2. The method of claim 1, wherein transmitting, to the first client device, the webinar backstage access information is based on identifying the first client device using the webinar access information.

3. The method of claim 2, wherein the webinar access information comprises:
identification of a participant corresponding to the first client device; and
a role of the participant in the webinar.

4. The method of claim 1, further comprising:
transmitting, to the first client device, an indication that the webinar has ended;
stopping transmission, to the first client device, of the first set of audio and video streams corresponding to the webinar mainstage; and
continuing transmission, to the first client device and the subset of the plurality of client devices, of the second set of audio and video streams corresponding to the webinar backstage.

5. The method of claim 1, further comprising:
receiving, from the first client device, a presentation indication; and
transmitting the audio stream and the video stream from the first client device as part of the first set of audio and video streams to the plurality of client devices of the webinar mainstage.

6. The method of claim 1, further comprising:
receiving, from a second client device, second webinar access information;
identifying the second client device as an attendee of the webinar;
transmitting, to the second client device, webinar mainstage access information; and
transmitting, to the second client device, the first set of audio and video streams corresponding to the webinar mainstage, wherein the second client device does not receive the second set of audio and video streams corresponding to the webinar backstage.

7. The method of claim 1, further comprising:
receiving, from a second client device, a second video stream and a second audio stream; and
transmitting the second video stream and the second audio stream to the subset of the plurality of client devices.

8. The method of claim 1, further comprising:
receiving, from a second client device of the plurality of client devices, second webinar access information;
determining that the second client device does not have access to the webinar backstage based on the second webinar access information; and
transmitting, to the second client device, the first set of audio and video streams corresponding to the webinar mainstage.

9. A system comprising:
a non-transitory computer-readable medium;
a communications interface; and
a processor communicatively coupled to the non-transitory computer-readable medium and the communications interface, the processor configured to execute processor-executable instructions stored in the non-transitory computer-readable medium to:
receive, from a first client device of a plurality of client devices, webinar access information for a webinar, wherein:
the plurality of client devices comprises:
one or more presenting client devices outputting a first set of audio and video streams; and
one or more attendee client devices outputting undistributed audio and video streams; and
the webinar comprises:
a webinar mainstage characterized by the first set of audio and video streams being accessible by the plurality of client devices; and
a webinar backstage characterized by a second set of audio and video streams accessible by a subset of the one or more presenting client devices;
identify the first client device based on the webinar access information;
transmit, to the first client device, webinar backstage access information
transmit to the first client device:
the first set of audio and video streams; and
the second set of audio and video streams;
receive, from the first client device, a first video stream and a first audio stream; and
transmit the first video stream and the first audio stream to the subset of the plurality of client devices.

10. The system of claim 9, wherein the processor configured to execute further processor-executable instructions stored in the non-transitory computer-readable medium to:
identify a participant corresponding to the first client device;
determine a role of the participant in the webinar; and
transmit to the first client device the webinar backstage access information based on the role.

11. The system of claim 9, wherein the processor is configured to execute further processor-executable instructions stored in the non-transitory computer-readable medium to:
receive an indication to transition the first client device to the webinar mainstage from the webinar backstage;
transmit, in response to the indication to transition the first client device to the webinar mainstage, a presentation indication to the first client device; and transmit the audio stream and the video stream from the first client device as part of the first set of audio and video streams to the plurality of client devices in the webinar mainstage.

12. The system of claim 11, wherein the processor is configured to execute further processor-executable instructions stored in the non-transitory computer-readable medium to:
receive a second indication to transition the first client device to the webinar backstage from the webinar mainstage; and
discontinue transmission of the audio stream and the video stream from the first client device as part of the first set of audio and video streams to the plurality of client devices in the webinar mainstage.

13. The system of claim 9, wherein the processor configured to execute further processor-executable instructions stored in the non-transitory computer-readable medium to:
receive an indication to transition a second client device from the webinar mainstage to the webinar backstage; and
transmit, in response to the indication to transition the second client device to the webinar backstage, the second set of audio and video streams corresponding to the webinar backstage.

14. A non-transitory computer-readable medium comprising processor-executable instructions configured to cause one or more processors to:
receive, from a first client device of a plurality of client devices, webinar access information for a webinar, wherein:
the plurality of client devices comprises: –one or more presenting client devices outputting a first set of audio and video streams; and
one or more attendee client devices outputting undistributed audio and video streams; and
the webinar comprises:
a webinar mainstage characterized by the first set of audio and video streams being accessible by the plurality of client devices; and
a webinar backstage characterized by a second set of audio and video streams accessible by a subset of the one or more presenting client devices;
identify the first client device based on the webinar access information;
transmit, to the first client device, webinar backstage access information;
transmit, to the first client device:
the first set of audio and video streams; and
the second set of audio and video streams;
receive, from the first client device, a first video stream and a first audio stream; and
transmit the first video stream and the first audio stream to the subset of the plurality of client devices.

15. The non-transitory computer-readable medium of claim 14, wherein the processor is configured to execute further processor-executable instructions stored in the non-transitory computer-readable medium to:
transmit, to the first client device, a status of the webinar mainstage.

16. The non-transitory computer-readable medium of claim 14, wherein the processor is configured to execute further processor-executable instructions stored in the non-transitory computer-readable medium to:
receive, from a host client device, a request to move the first client device from the webinar backstage to the webinar mainstage; and
transmit, to the plurality of client devices in the webinar mainstage, the audio stream and the video stream from the first client device as part of the first set of audio and video streams.

17. The non-transitory computer-readable medium of claim 16, wherein the processor is configured to execute further processor-executable instructions stored in the non-transitory computer-readable medium to:
stop transmitting, to the first client device, the second set of audio and video streams corresponding to the webinar backstage.

18. The non-transitory computer-readable medium of claim 14, wherein the processor is configured to execute further processor-executable instructions stored in the non-transitory computer-readable medium to:
receive, from a second client device, second webinar access information;
identify the second client device based on the webinar access information;
transmit, to the second client device, webinar mainstage access information; and
transmit the second client device the first set of audio and video streams corresponding to the webinar mainstage.

19. The non-transitory computer-readable medium of claim 14, wherein the processor is configured to execute further processor-executable instructions stored in the non-transitory computer-readable medium to:
receive a chat message from the first client device in the webinar backstage; and
transmit the chat message in a chat message box to the plurality of client devices in the webinar backstage.

20. The non-transitory computer-readable medium of claim 14, wherein the processor is configured to execute further processor-executable instructions stored in the non-transitory computer-readable medium to:
receive a message from the first client device in the webinar backstage; and
transmit the message to the plurality of client devices in the webinar mainstage.

* * * * *